(12) United States Patent
Pelletti et al.

(10) Patent No.: US 11,495,877 B2
(45) Date of Patent: Nov. 8, 2022

(54) MULTI-LAYER, MULTI-STEERING ANTENNA SYSTEM FOR AUTONOMOUS VEHICLES

(71) Applicant: Metawave Corporation, Palo Alto, CA (US)

(72) Inventors: Chiara Pelletti, San Francisco, CA (US); Taha Yekan, San Diego, CA (US)

(73) Assignee: METAWAVE Corporation, Carlsbad, CA (US)

( * ) Notice: Subject to any disclaimer, the term of this patent is extended or adjusted under 35 U.S.C. 154(b) by 241 days.

(21) Appl. No.: 16/542,151

(22) Filed: Aug. 15, 2019

(65) Prior Publication Data

US 2020/0058987 A1    Feb. 20, 2020

Related U.S. Application Data

(60) Provisional application No. 62/765,152, filed on Aug. 17, 2018.

(51) Int. Cl.
| | |
|---|---|
| *H01Q 1/32* | (2006.01) |
| *H01Q 21/06* | (2006.01) |
| *G01S 13/931* | (2020.01) |
| *G01S 7/03* | (2006.01) |
| *H01Q 3/36* | (2006.01) |

(52) U.S. Cl.
CPC .......... *H01Q 1/3233* (2013.01); *G01S 7/032* (2013.01); *G01S 13/931* (2013.01); *H01Q 3/36* (2013.01); *H01Q 21/064* (2013.01)

(58) Field of Classification Search
CPC ...... H01Q 21/064; H01Q 3/36; H01Q 1/3233; H01Q 21/005; H01Q 21/0064; G01S 7/032; G01S 13/931
See application file for complete search history.

(56) References Cited

U.S. PATENT DOCUMENTS

| | | | | |
|---|---|---|---|---|
| 9,172,145 | B2* | 10/2015 | Puzella | H01P 1/38 |
| 9,395,727 | B1* | 7/2016 | Smith | G05D 1/0257 |
| 10,050,336 | B2* | 8/2018 | Wang | H01Q 21/0043 |
| 10,054,669 | B1* | 8/2018 | Izadian | H01Q 21/0037 |
| 10,230,172 | B1* | 3/2019 | Wolf | H01Q 21/064 |
| 10,474,160 | B2* | 11/2019 | Huang | G06T 3/40 |

(Continued)

*Primary Examiner* — Peter M Bythrow
(74) *Attorney, Agent, or Firm* — Sandra Lynn Godsey

(57) ABSTRACT

Examples disclosed herein relate to a multi-layer, multi-steering (MLMS) antenna array for autonomous vehicles. The MLMS antenna array includes a superelement antenna array layer comprising superelement subarrays, in which each superelement subarray includes radiating slots for radiating a transmission signal. The MLMS antenna array also includes a power divider layer coupled to the superelement antenna array layer and configured to serve as a feed to the superelement antenna array layer, in which the power divider layer is coupled to phase shifters that apply different phase shifts to transmission signals propagating to the superelement antenna array layer. The MLMS antenna array also includes a transition layer configured to couple the power divider layer and the superelement antenna array layer to the phase shifters through transition structures such as through-hole vias. Other examples disclosed herein include a radar system for use in an autonomous driving vehicle.

20 Claims, 17 Drawing Sheets

(56) References Cited

U.S. PATENT DOCUMENTS

| | | | |
|---|---|---|---|
| 10,541,461 B2* | 1/2020 | Teshiba | H01Q 1/526 |
| 10,749,270 B2* | 8/2020 | Behdad | H01Q 15/14 |
| 2015/0288063 A1* | 10/2015 | Johnson | H01Q 3/24 |
| | | | 342/368 |
| 2016/0141754 A1* | 5/2016 | Leyh | H01Q 21/0075 |
| | | | 342/372 |
| 2017/0285137 A1* | 10/2017 | West | H01Q 25/02 |
| 2018/0108991 A1* | 4/2018 | Klemes | H01Q 21/067 |
| 2019/0305421 A1* | 10/2019 | Eom | H01Q 3/38 |

* cited by examiner

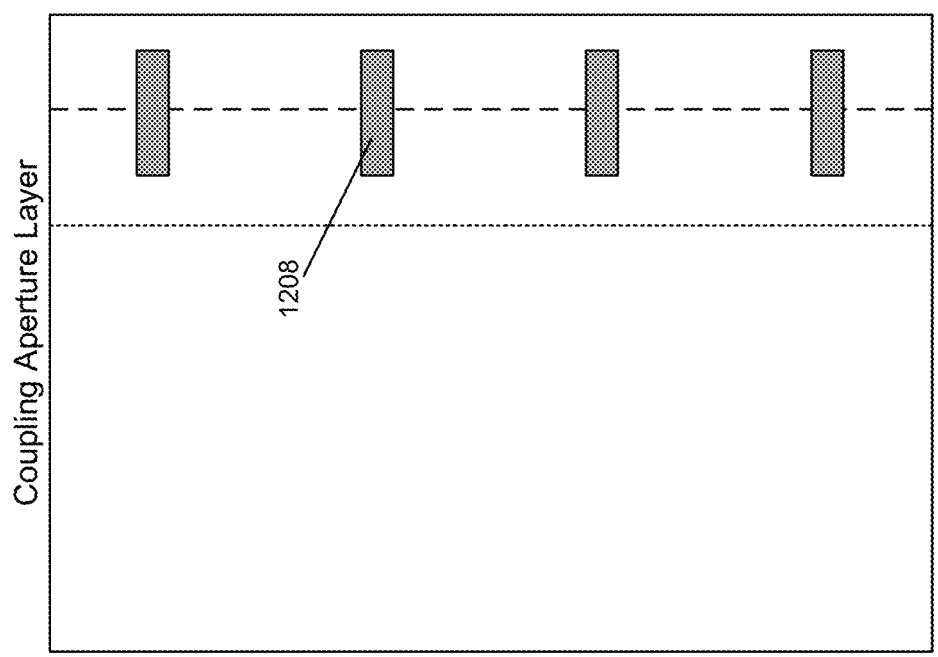

MULTI-LAYER, MULTI-STEERING ANTENNA SYSTEM FOR AUTONOMOUS VEHICLES

CROSS-REFERENCE TO RELATED APPLICATIONS

This application claims priority from U.S. Provisional Application No. 62/765,152, titled "MULTI-LAYER, MULTI-STEERING ANTENNA SYSTEM FOR AUTONOMOUS VEHICLES," filed on Aug. 17, 2018, and incorporated herein by reference in its entirety.

BACKGROUND

Autonomous driving is quickly moving from the realm of science fiction to becoming an achievable reality. Already in the market are Advanced-Driver Assistance Systems (ADAS) that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify targets in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and in which:

FIGS. 12A-B illustrate example coupling aperture layers for use in the antenna layer of FIG. 11 in accordance with some implementations of the subject technology;

DETAILED DESCRIPTION

Figure 1:
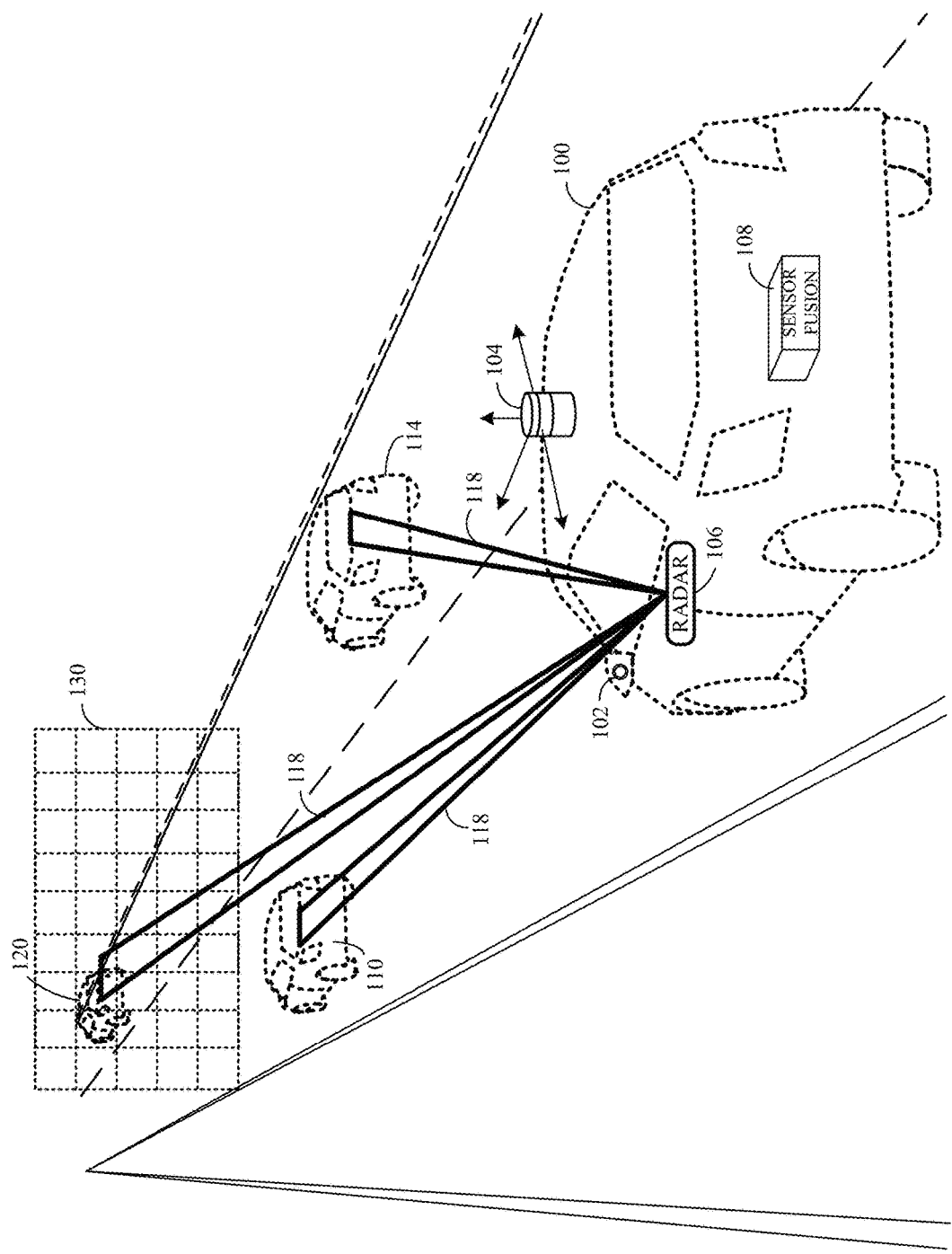
FIG. 1 illustrates an example environment in which a beam steering radar in an autonomous vehicle is used to detect and identify objects, according to various implementations of the subject technology.

A Multi-Layer, Multi-Steering (MLMS) antenna array for millimeter wavelength ("mm-wave") applications is disclosed. The MLMS antenna array is suitable for many different mm-wave applications and can be deployed in a variety of different environments and configurations. Mm-wave applications can operate with frequencies between 30 and 300 GHz or a portion thereof, including autonomous driving applications in the 77 GHz range and 5G applications in the 60 GHz range, among others. In various examples, the MLMS antenna array is incorporated in a radar in an autonomous driving vehicle to detect and identify targets in the vehicle's path and surrounding environment. The targets may include structural elements in the environment such as roads, walls, buildings, road center medians and other objects, as well as vehicles, pedestrians, bystanders, cyclists, plants, trees, animals and so on. The MLMS antenna array enables a radar to be a "digital eye" with true 3D vision and human-like interpretation of the world.

The subject disclosure provides for a MLMS antenna system having a multilayered structure with a transition layer that facilitates transition of an incoming signal propagating from a power divider circuit to a transmission line for transmission to an antenna, with a wideband frequency response and minimal reflection characteristics. In some aspects, the transition layer of the MLMS antenna system includes a transition module that is coupled to phase shifters and a matching circuit disposed on a radio frequency integrated circuit (RFIC) layer.

In some aspects, vertical transition structures, such as through-hole vias, are added into the multilayered structure of the multi-layer, multi-steering antenna system to reach internal layers within the multilayered structure. In some aspects, the power divider circuit is located on a different layer from that of the antenna. The power divider circuit may be electrically coupled to a ground plane for grounding. However, such grounding may produce a stub effect that causes an unwanted shorting of a desired frequency band. By implementing a transition module coupled to the phase shifters within the internal layers of the multilayered structure, the power divider and antenna layers can be implemented with a wideband frequency response while reducing the reflection coefficient of the transmission line. The subject technology may be applicable to any high-frequency antenna systems that need wideband response and low reflection loss.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

FIG. 1 illustrates an example environment in which a beam steering radar in an autonomous vehicle is used to detect and identify objects, according to various implementations of the subject technology. Ego vehicle 100 is an autonomous vehicle with a beam steering radar system 106 for transmitting a radar signal to scan a FoV or specific area. As described in more detail below, the radar signal is transmitted according to a set of scan parameters that can be adjusted to result in multiple transmission beams 118. The scan parameters may include, among others, the total angle of the scanned area defining the FoV, the beam width or the scan angle of each incremental transmission beam, the number of chirps in the radar signal, the chirp time, the chirp segment time, the chirp slope, and so on. The entire FoV or a portion of it can be scanned by a compilation of such transmission beams 118, which may be in successive adjacent scan positions or in a specific or random order. Note that the term FoV is used herein in reference to the radar transmissions and does not imply an optical FoV with unobstructed views. The scan parameters may also indicate the time interval between these incremental transmission beams, as well as start and stop angle positions for a full or partial scan.

In various examples, the ego vehicle 100 may also have other perception sensors, such as a camera 102 and a lidar 104. These perception sensors are not required for the ego vehicle 100, but may be useful in augmenting the object detection capabilities of the beam steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions or operations of the vehicle. Existing ADAS modules utilize camera sensors to assist drivers in driving functions such as parking (e.g., in rear view cameras). Cameras are able to capture texture, color and contrast information at a high level of detail, but similar to the human eye, they are susceptible to adverse weather conditions and variations in lighting. The camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars at different locations around the vehicle to provide the full 360° view. However, lidar sensors such as lidar 104 are still prohibitively expensive, bulky in size, sensitive to weather conditions and are limited to short ranges (e.g., less than 150-300 meters). Radars, on the other hand, have been used in vehicles for many years and operate in all-weather conditions. Radar sensors also use far less processing than the other types of sensors and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam steering radar 106 can provide a 360° true 3D vision and human-like interpretation of the path and surrounding environment of the ego vehicle 100. The beam steering radar 106 is capable of shaping and steering RF beams in all directions in a 360° FoV with at least one beam steering antenna and recognize objects quickly and with a high degree of accuracy over a long range of around 300 meters or more. The short-range capabilities of the camera 102 and the lidar 104 along with the long range capabilities of the radar 106 enable a sensor fusion module 108 in the ego vehicle 100 to enhance its object detection and identification.

As illustrated, the beam steering radar 106 can detect both vehicle 120 at a far range (e.g., greater than 350 m) as well as a vehicles 110 and 114 at a short range (e.g., lesser than 100 m). Detecting both vehicles in a short amount of time and with enough range and velocity resolution is imperative for full autonomy of driving functions of the ego vehicle. The radar 106 has an adjustable Long-Range Radar (LRR) mode that enables the detection of long range objects in a very short time to then focus on obtaining finer velocity resolution for the detected vehicles. Although not described herein, radar 106 is capable of time-alternatively reconfiguring between LRR and Short-Range Radar (SRR) modes. The SRR mode enables a wide beam with lower gain, but is able to make quick decisions to avoid an accident, assist in parking and downtown travel, and capture information about a broad area of the environment. The LRR mode enables a narrow, directed beam and long distance, having high gain; this is powerful for high speed applications, and where longer processing time allows for greater reliability. Excessive dwell time for each beam position may cause blind zones, and the adjustable LRR mode ensures that fast object detection can occur at long range while maintaining the antenna gain, transmit power and desired Signal-to-Noise Ratio (SNR) for the radar operation.

Figure 2:
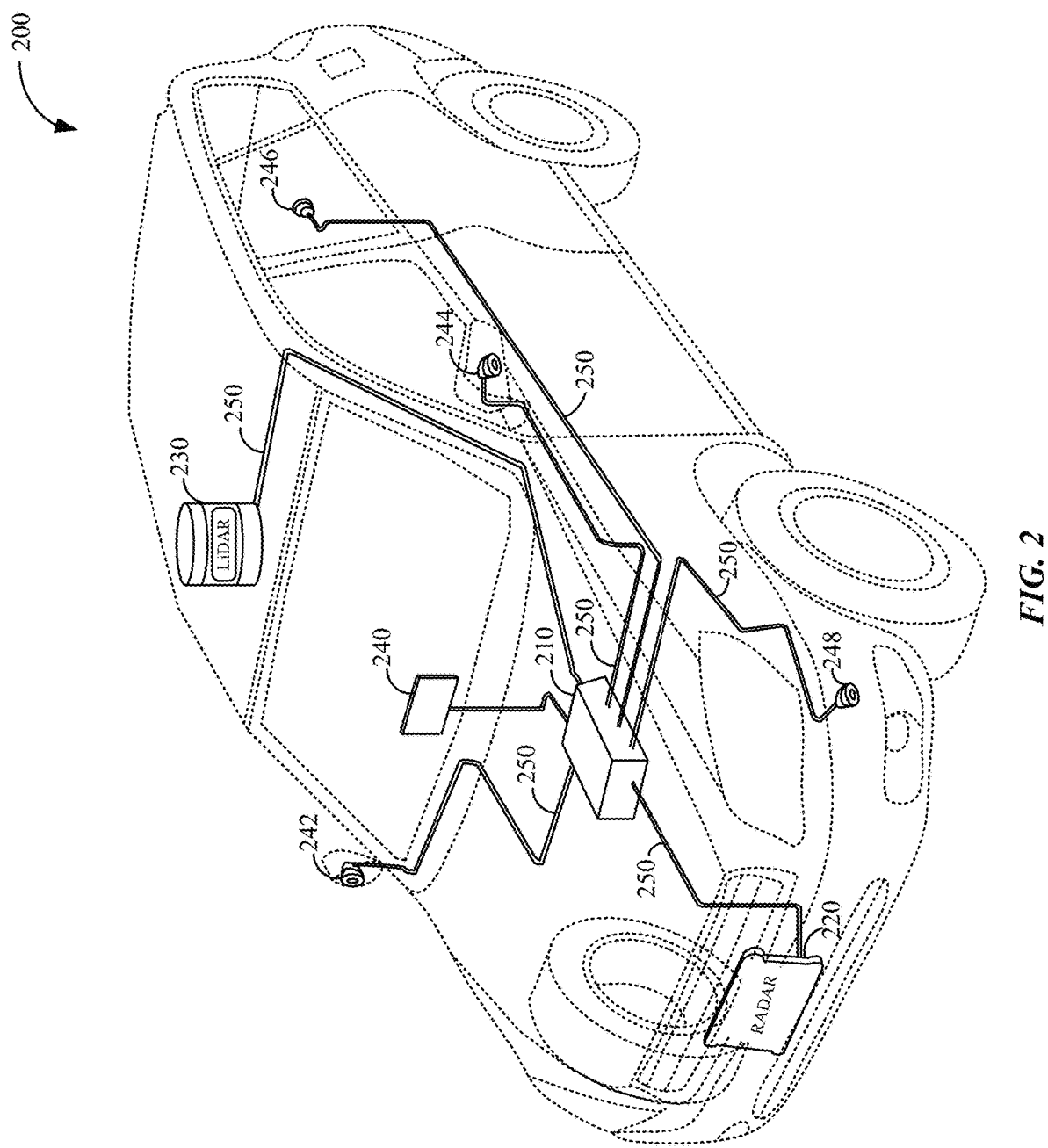
FIG. 2 illustrates an example network environment in which a radar system may be implemented in accordance with one or more implementations of the subject technology.

FIG. 2 illustrates an example network environment 200 in which a radar system may be implemented in accordance with one or more implementations of the subject technology. The example network environment 200 includes a number of electronic devices 220, 230, 240, 242, 244, 246, and 248 that are coupled to an electronic device 210 via the transmission lines 250. The electronic device 210 may communicably couple the electronic devices 242, 244, 246, 248 to one another. In one or more implementations, one or more of the electronic devices 242, 244, 246, 248 are communicatively coupled directly to one another, such as without the support of the electronic device 210. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 250 are Ethernet transmission lines. In this respect, the electronic devices 220, 230, 240, 242, 244, 246, 248 and 210 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 210 may be, or may include, a switch device, a routing device, a hub device, or generally any device that may communicably couple the electronic devices 220, 230, 240, 242, 244, 246, and 248.

In one or more implementations, at least a portion of the example network environment 200 is implemented within a vehicle, such as a passenger car. For example, the electronic devices 242, 244, 246, 248 may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 2, the electronic device 210 is depicted as a central processing unit, the electronic device 220 is depicted as a radar system, the electronic device 230 is depicted as a LiDAR system, the electronic device 240 is depicted as an entertainment interface unit, and the electronic devices 242, 244, 246, 248 are depicted as camera devices, such as forward-view, rear-view and side-view cameras. In one or more implementations, the electronic device 210 and/or one or more of the electronic devices 242, 244, 246, 248 may be communicatively coupled to a public communication network, such as the Internet.

Figure 3:
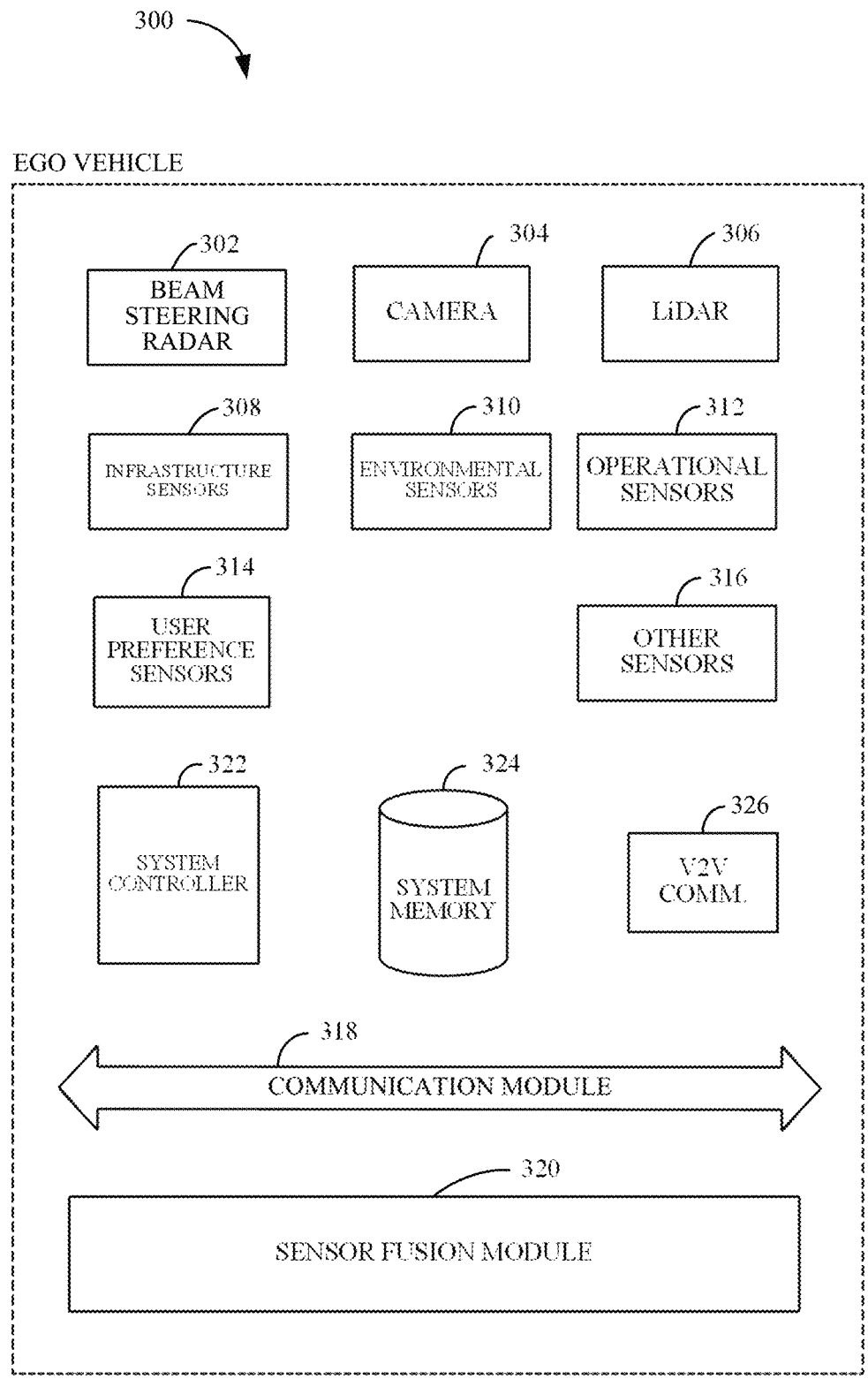
FIG. 3 illustrates a schematic diagram of an autonomous driving system for an ego vehicle in accordance with various implementations of the subject technology.

Attention is now directed to FIG. 3, which illustrates a schematic diagram of an autonomous driving system 300 for an ego vehicle in accordance with various implementations of the subject technology. The autonomous driving system 300 is a system for use in an ego vehicle (e.g., the ego vehicle 200 of FIG. 2) that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 300 includes a beam steering radar system 302 and other sensor systems such as camera 304, lidar 306, infrastructure sensors 308, environmental sensors 310, operational sensors 312, user preference sensors 314, and other sensors 316. The autonomous driving system 300 also includes a communications module 318, a sensor fusion module 320, a system controller 322, a system memory 324, and a Vehicle-to-Vehicle (V2V) communications module 326. It is appreciated that this configuration of the autonomous driving system 300 is an example configuration and not meant to be limiting to the specific structure illustrated in FIG. 3. Additional systems and modules not shown in FIG. 3 may be included in autonomous driving system 300.

In various examples, the beam steering radar 302 includes at least one beam steering antenna for providing dynamically controllable and steerable beams that can focus on one or multiple portions of a 360° FoV of the vehicle. The beams radiated from the beam steering antenna are reflected back from objects in the vehicle's path and surrounding environment and received and processed by the radar 302 to detect and identify the objects. The radar 302 includes a perception module that is trained to detect and identify objects and control the radar module as desired. The camera 304 and lidar 306 may also be used to identify objects in the path and surrounding environment of the ego vehicle, albeit at a much lower range.

Infrastructure sensors 308 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensors 310 detect various conditions outside, such as temperature, humidity, fog, visibility, precipitation, among others. Operational sensors 312 provide information about the functional operation of the vehicle. This may be tire pressure, fuel levels, brake wear, and so forth. The user preference sensors 314 may detect conditions that are part of a user preference. This may be temperature adjustments, smart window shading, etc. Other sensors 316 may include additional sensors for monitoring conditions in and around the ego vehicle.

In various examples, the sensor fusion module 320 optimizes these various functions to provide an approximately comprehensive view of the ego vehicle and environments. Many types of sensors may be controlled by the sensor fusion module 320. These sensors may coordinate with each other to share information and consider the impact of one control action on another system. In one example, in a congested driving condition, a noise detection module (not shown) may identify that there are multiple radar signals that may interfere with the vehicle. This information may be used by a perception module in the radar 302 to adjust the scan parameters of the radar 302 to avoid these other signals and minimize interference.

In another example, environmental sensors 310 may detect that the weather is changing, and visibility is decreasing. In this situation, the sensor fusion module 320 may determine to configure the other sensors to improve the ability of the vehicle to navigate in these new conditions. The configuration may include turning off the camera 304 and/or the lidar 306, or reducing the sampling rate of these visibility-based sensors. This effectively places reliance on the sensor(s) adapted for the current situation. In response, the perception module configures the radar 302 for these conditions as well. For example, the radar 302 may reduce the beam width to provide a more focused beam, and thus a finer sensing capability.

In various examples, the sensor fusion module 320 may send a direct control to the radar 302 based on historical conditions and controls. The sensor fusion module 320 may also use some of the sensors within the autonomous driving system 300 to act as feedback or calibration for the other sensors. In this way, the operational sensor 312 may provide feedback to the perception module and/or to the sensor fusion module 320 to create templates, patterns and control scenarios. These are based on successful actions or may be based on poor results, where the sensor fusion module 320 learns from past actions.

Data from the sensors 302-316 may be combined in the sensor fusion module 320 to improve the target detection and identification performance of autonomous driving system 300. The sensor fusion module 320 may itself be controlled by the system controller 322, which may also interact with and control other modules and systems in the ego vehicle. For example, the system controller 322 may power on or off the different sensors 302-316 as desired, or provide instructions to the ego vehicle to stop upon identifying a driving hazard (e.g., deer, pedestrian, cyclist, or another vehicle suddenly appearing in the vehicle's path, flying debris, etc.)

All modules and systems in the autonomous driving system 300 communicate with each other through the communication module 318. The system memory 324 may store information and data (e.g., static and dynamic data) used for operation of the autonomous driving system 300 and the ego vehicle using the autonomous driving system 300. The V2V communications module 326 is used for communication with other vehicles. The V2V communications module 326 may also obtain information from other vehicles that is non-transparent to the user, driver, or rider of the ego vehicle, and may help vehicles coordinate with one another to avoid any type of collision.

Figure 4:
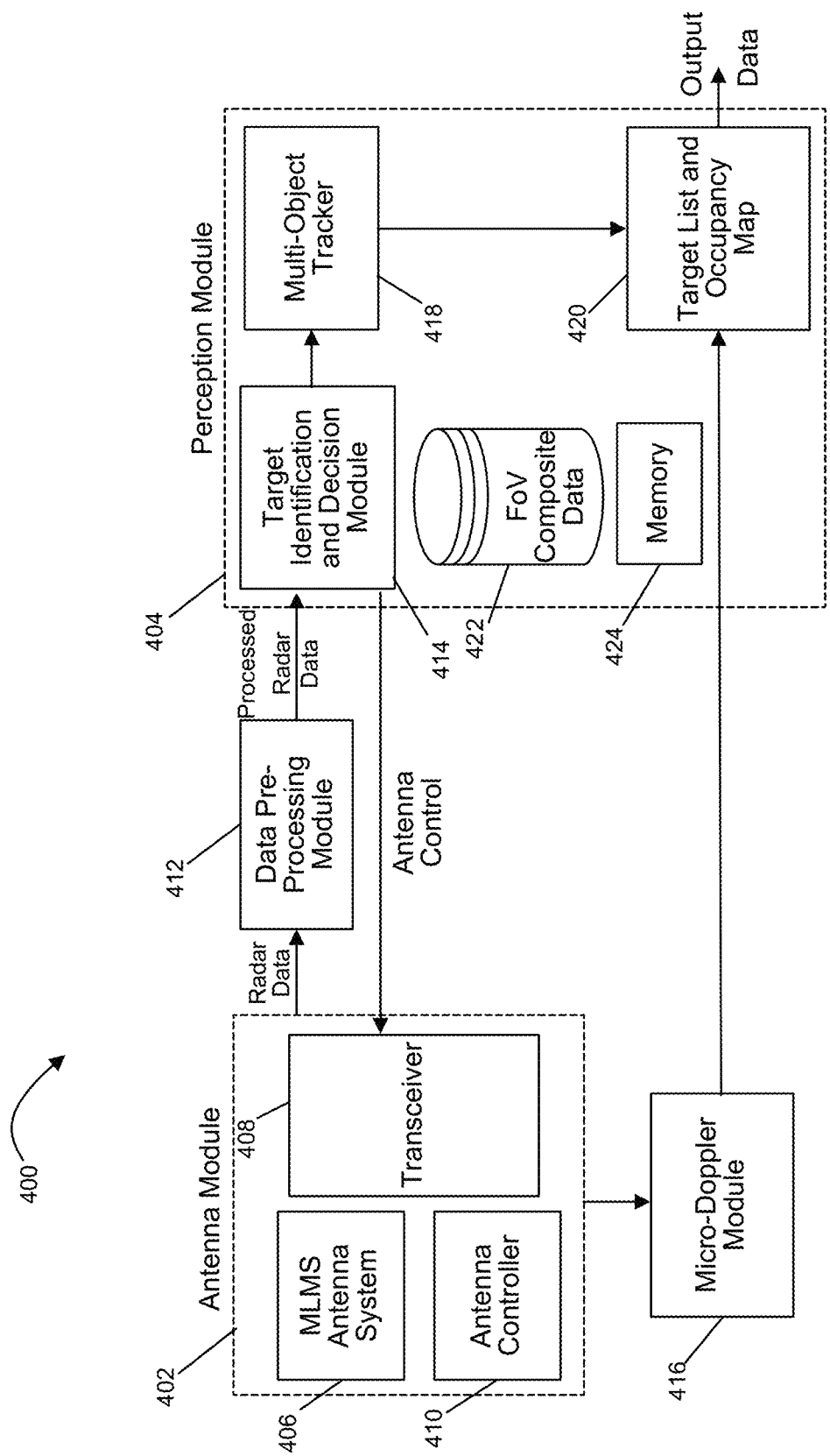
FIG. 4 illustrates a schematic diagram of a radar system for use in an autonomous driving system in accordance with some implementations of the subject technology.

FIG. 4 illustrates a schematic diagram of a radar system 400 in accordance with some implementations of the subject technology. The radar system 400 includes an antenna Module 402 and a perception Module 404. The radar system 400 is a "digital eye" with true 3D vision and capable of a human-like interpretation of the world. The "digital eye" and human-like interpretation capabilities are provided by the two main modules: the antenna module 402 and the perception module 404. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The antenna module 402 includes a MLMS antenna 406, a transceiver module 408 and an antenna controller 410. The MLMS antenna 406 can radiate dynamically controllable and highly-directive Radio Frequency (RF) beams using meta-structures. A meta-structure, as generally defined herein, is an engineered, non- or semi-periodic structure that is spatially distributed to meet a specific phase and frequency distribution. In some implementations, the meta-structures include metamaterials. The transceiver module 408 is coupled to the MLMS antenna 406, and prepares a signal for transmission, such as a signal for a radar device. In some aspects, the signal is defined by modulation and frequency. The signal is provided to the MLMS antenna 406 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 410, such as at the direction of perception module 404.

The RF beams reflect from targets in the ego vehicle's path and surrounding environment, and the RF reflections are received by the transceiver module 408. Radar data from the received RF beams is provided to the perception module 404 for target detection and identification. A super-resolution network 412 increases the resolution of the radar data prior to it being processed to detect and identify targets. For example, the super-resolution network 412 can process the radar data and determine high resolution radar data for use by the perception module 404. In various examples, the super-resolution network 412 can be a part of the perception module 404, such as on the same circuit board as the other modules within the perception module 404. Also, in various examples, the data encoding may use the lidar point cloud from the ego lidar to perform NLOS correction in the radar data.

The radar data may be organized in sets of Range-Doppler (RD) map information, corresponding to four-dimensional (4D) information that is determined by each RF beam reflected from targets, such as azimuthal angles, elevation angles, range, and velocity. The RD maps may be extracted from FMCW radar signals and may contain both noise and systematic artifacts from Fourier analysis of the radar signals. The perception module 404 controls further operation of the antenna module 402 by, for example, providing an antenna control signal containing beam parameters for the next RF beams to be radiated from MTM cells in the MLMS antenna 406.

In operation, the antenna controller 410 is responsible for directing the MLMS antenna 406 to generate RF beams with determined parameters such as beam width, transmit angle, and so on. The antenna controller 410 may, for example, determine the parameters at the direction of perception module 404, which may at any given time determine to focus on a specific area of a Field-of-View (FoV) upon identifying targets of interest in the ego vehicle's path or surrounding environment. The antenna controller 410 determines the direction, power, and other parameters of the RF beams and controls the MLMS antenna 406 to achieve beam steering in various directions. The antenna controller 410 also determines a voltage matrix to apply to reactance control mechanisms coupled to the MLMS antenna 406 to achieve a given phase shift. In some examples, the MLMS antenna 406 is adapted to transmit a directional beam through active control of the reactance parameters of the individual MTM cells that make up the MLMS antenna 406. The perception module 404 provides control actions to the antenna controller 410 at the direction of the Target Identification and Decision Module 414.

Next, the MLMS antenna 406 radiates RF beams having the determined parameters. The RF beams are reflected from targets in and around the ego vehicle's path (e.g., in a 360° field of view) and are received by the transceiver module 408 in antenna module 402. The antenna module 402 transmits the received 4D radar data to the super-resolution network 412 for increasing the resolution of the radar data, for which higher resolution radar data is then sent to the target identification and decision module 414 of the perception module 404. The use of the super-resolution network 412 also improves the training and performance of the target identification and decision module 414. A micro-doppler module 416 coupled to the antenna module 402 and the perception module 404 extracts micro-doppler signals from the 4D radar data to aid in the identification of targets by the perception module 404. The micro-doppler module 416 takes a series of RD maps from the antenna module 402 and extracts a micro-doppler signal from them. The micro-doppler signal enables a more accurate identification of targets as it provides information on the occupancy of a target in various directions. Non-rigid targets such as pedestrians and cyclists are known to exhibit a time-varying doppler signature due to swinging arms, legs, etc. By analyzing the frequency of the returned radar signal over time, the perception module 404 can determine the class of the target (i.e., whether a vehicle, pedestrian, cyclist, animal, etc.) with over 90% accuracy. Further, as this classification may be performed by a linear Support Vector Machine (SVM), it is extremely computationally efficient. In various examples, the micro-doppler module 416 can be a part of the antenna module 402 or the perception module 404, such as on the same circuit board as the other modules within the antenna module 402 or perception module 404.

The target identification and decision module 414 receives the higher resolution radar data from the super-resolution network 412, processes the data to detect and identify targets, and determines the control actions to be performed by the antenna module 402 based on the detection and identification of such targets. For example, the target identification and decision module 414 may detect a cyclist on the path of the ego vehicle and direct the antenna module 402, at the instruction of its antenna controller 410, to focus additional RF beams at a given phase shift and direction within the portion of the FoV corresponding to the cyclist's location.

The perception module 404 may also include a multi-object tracker 418 to track the identified targets over time, such as, for example, with the use of a Kalman filter. The multi-object tracker 418 matches candidate targets identified by the target identification and decision module 414 with targets it has detected in previous time windows. By combining information from previous measurements, expected measurement uncertainties, and some physical knowledge, the multi-object tracker 418 generates robust, accurate estimates of target locations.

Information on identified targets over time are then stored at a target list and occupancy map 420, which keeps track of targets' locations and their movement over time as determined by the multi-object tracker 418. The tracking information provided by the multi-object tracker 418 and the micro-doppler signal provided by the micro-doppler module 416 are combined at the target list and occupancy map 420 to produce an output containing the type/class of target identified, their location, their velocity, and so on. This information from radar system 400 is then sent to a sensor fusion module (not shown), where it is processed together with information from other sensors in the ego vehicle.

In various examples, the perception module 404 includes an FoV composite data unit 422, which stores information that describes an FoV. This information may be historical data used to track trends and anticipate behaviors and traffic conditions or may be instantaneous or real-time data that describes the FoV at a moment in time or over a window in time. The ability to store this data enables the perception module 404 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception module 404 may determine to narrow the beam width for a more focused view of that sector or area in the FoV. The next scan may indicate the targets' length or other dimension, and if the target is a vehicle, the perception module 404 may consider what direction the target is moving and focus the beams on that area. Similarly, the echo may be from a spurious target, such as a bird, which is small and moving quickly out of the path of the vehicle. There are a variety of other uses for the FoV composite data 422, including the ability to identify a specific type of target based on previous detection. The perception module 404 also includes a memory 424 that stores useful data for radar system 400, such as, for example, information on which subarrays of the MLMS antenna 406 perform better under different conditions.

In various examples described herein, the use of radar system 400 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 515 km/h, a driver may need to slow down to 50 km/h when visibility is poor. Using the radar system 400, the driver (or driverless vehicle) may maintain the maximum safe speed without regard to the weather conditions. Even if other drivers slow down, a vehicle enabled with the radar system 400 can detect those slow-moving vehicles and obstacles in its path and avoid/navigate around them.

Additionally, in highly congested areas, it is necessary for an autonomous vehicle to detect targets in sufficient time to react and take action. The examples provided herein for a radar system increase the sweep time of a radar signal so as to detect any echoes in time to react. In rural areas and other areas with few obstacles during travel, the perception module 404 adjusts the focus of the RF beam to a larger beam width, thereby enabling a faster scan of areas where there are few echoes. The perception module 404 may detect this situation by evaluating the number of echoes received within a given time period and making beam size adjustments accordingly. Once a target is detected, the perception module 404 determines how to adjust the beam focus. This is achieved by changing the specific configurations and conditions of the MLMS antenna 406. In one example scenario, the voltages on the reactance control mechanisms of the reactance control module of MLMS antenna 406 are adjusted. In another example scenario, a subset of unit cells is configured as a subarray. This configuration means that this set may be treated as a single unit, and all the cells within the subarray are adjusted similarly. In another scenario, the subarray is changed to include a different number of unit cells, where the combination of unit cells in a subarray may be changed dynamically to adjust to conditions and operation of the radar system 400.

All of these detection scenarios, analysis and reactions may be stored in the perception module 404, such as in the memory 424, and used for later analysis or simplified reactions. For example, if there is an increase in the echoes received at a given time of day or on a specific highway, that information is fed into the antenna controller 410 to assist in proactive preparation and configuration of the MLMS antenna 406. Additionally, there may be some subarray combinations that perform better, such as to achieve a desired result, and this is stored in the memory 424.

Figure 5:
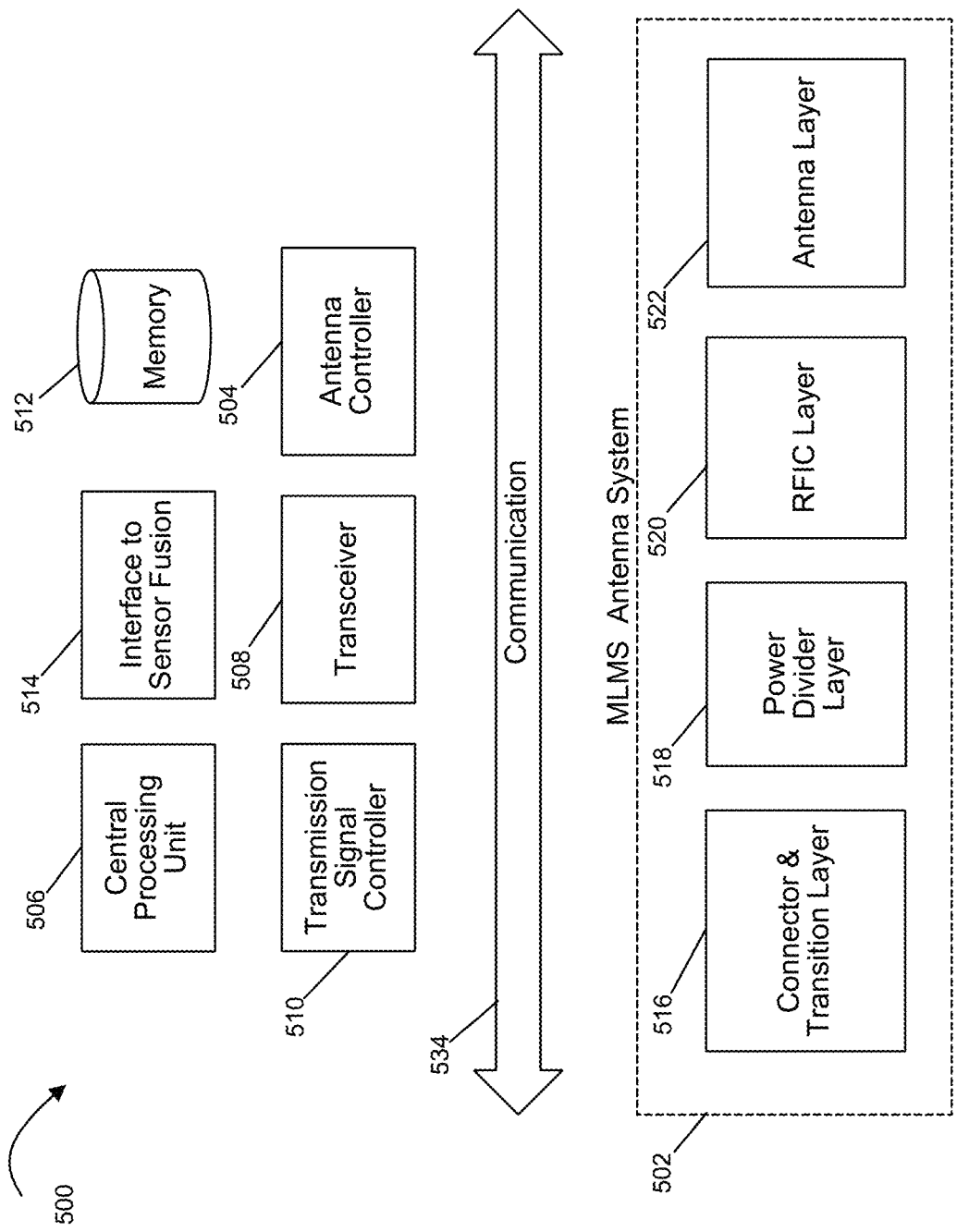
FIG. 5 illustrates a schematic diagram of an antenna module for use with the radar system of FIG. 4 in accordance with some implementations of the subject technology.

Attention is now directed to FIG. 5, which shows a schematic diagram of an antenna module 500 for use with the radar system 400 of FIG. 4 in accordance with some implementations of the subject technology. The antenna module 500 has an MLMS antenna system 502 coupled to an antenna controller 504, a central processor 506, and a transceiver 508. A transmission signal controller 510 generates the specific transmission signal, such as an FMCW signal, which is used for radar sensor applications as the transmitted signal is modulated in frequency, or phase. The FMCW signal enables a radar to measure range to a target by measuring the phase differences in phase or frequency between the transmitted signal and the received or reflected signal. Within FMCW formats, there are a variety of modulation patterns that may be used within FMCW, including sinusoidal, triangular, sawtooth, rectangular and so forth, each having advantages and purposes. For example, sawtooth modulation may be used for large distances to a target; a triangular modulation enables use of the Doppler frequency, and so forth.

Other modulation types may be incorporated according to the desired information and specifications of a system and application. For example, the transmission signal controller 510 may also generate a cellular modulated signal, such as an Orthogonal Frequency Division Multiplexed (OFDM) signal. In some examples, the signal is provided to the antenna module 500 and the transmission signal controller 510 may act as an interface, translator or modulation controller, or otherwise as required for the signal to propagate through a transmission line system. The received information is stored in a memory storage unit 512, wherein the information structure may be determined by the type or transmission and modulation pattern.

In various examples, the MLMS antenna system 502 radiates the signal through a structure consisting of four main layers: (1) connector and transition layer 516; (2) power divider layer 518; (3) RFIC layer 520; and (4) antenna layer 522. The connector and transition layer 516 couples the transmission signal from the transmission signal controller 510 to the PCB for transmission to the power divider layer 518. The power divider layer 518 is a corporate feed structure having a plurality of transmission lines for transmitting the signal to the antenna layer 522. The antenna layer 522 includes a plurality of radiating slots for radiating the signal into the air. The slots are configured in a specific pattern as described below, but other patterns, shapes, dimensions, orientations and specifications may be used to achieve a variety of radiation patterns. The RFIC layer 520 includes phase shifters (e.g., a varactor, a set of varactors, or a phase shift network) to achieve any desired phase shift in a range of 0° to 360°. The RFIC layer 520 also includes transitions from the power divider layer 518 to the RFIC layer 520 and from the RFIC layer 520 to the antenna layer 522.

Although FIG. 5 depicts one MLMS antenna system 502 in the antenna module 500, the antenna module 500 may have multiple MLMS antenna systems in any given configuration depending on implementation. A set of MLMS antennas may be configured to serve as transmit antennas, and another set of MLMS antennas may be configured to serve as receive antennas. In one or more implementations, an MLMS antenna in the MLMS antenna system 502 may be orthogonal to another antenna in the MLMS antenna system 502. Different MLMS antennas may also have different polarizations. In various examples, different MLMS antennas may be configured to detect different targets, e.g., a first set of antennas may be configured to enhance the detection and identification of pedestrians, a second set of antennas may be configured to enhance the detection and identification of vehicles, and so forth. In the case of pedestrians, the configuration of the MLMS antennas may include power amplifiers to adjust the power of a transmitted signal and/or apply different polarization modes for different arrays to enhance pedestrian detection. It is appreciated that numerous configurations of MLMS antennas may be implemented in a given antenna module.

In operation, the antenna controller 504 receives information from other modules in the antenna module 500 and/or from the perception module 404 of FIG. 4 indicating a next radiation beam, in which a radiation beam may be specified by parameters such as beam width, transmit angle, transmit direction and so forth. The antenna controller 504 determines a voltage matrix to apply to reactance control mechanisms in the MLMS antenna system 502 to achieve a given phase shift or other antenna parameters.

Transceiver 508 prepares a signal for transmission, such as a signal for a radar device, wherein the signal is defined by modulation and frequency. The signal is received by the MLMS antenna system 502 and the desired phase of the radiated signal is adjusted at the direction of the antenna controller 504. In some examples, the MLMS antenna system 502 can be implemented in many applications, including radar, cellular antennas, and autonomous vehicles to detect and identify targets in the path of or surrounding the vehicle. Alternate examples may use the MLMS antenna for wireless communications, medical equipment, sensing, monitoring, and so forth. Each application type incorporates designs and configurations of the elements, structures and modules described herein to accommodate their needs and goals.

In the antenna module 500, a signal is specified by antenna controller 504, which may be at the direction of perception module (e.g., perception module 404 in FIG. 4), a sensor fusion module via interface-to-sensor fusion 514, or it may be based on program information from memory storage 512. There are a variety of considerations to determine the beam formation, wherein this information is provided to antenna controller 504 to configure the various elements of the MLMS antenna system 502, which are described herein. The transmission signal controller 510 generates the transmission signal and provides it to the MLMS antenna system 502, such as through a coaxial cable or other connector. The signal propagates through the connector and transition layer 516 to the antenna layer 522 for transmission through the air.

The antenna structure of FIG. 5 may be referred to as a type of slotted wave guide antenna (SWGA), in which the power divider layer 518 is configured to serve as a feed to the antenna layer 522. Alternate examples may reconfigure and/or modify the antenna structure to improve radiation patterns, bandwidth, side lobe levels, and so forth. The antenna performance may be adjusted by design of the antenna's features and materials, such as the shape of the slots, slot patterns, slot dimensions, conductive trace materials and patterns, as well as other modifications to achieve impedance matching and so forth.

Figure 6:
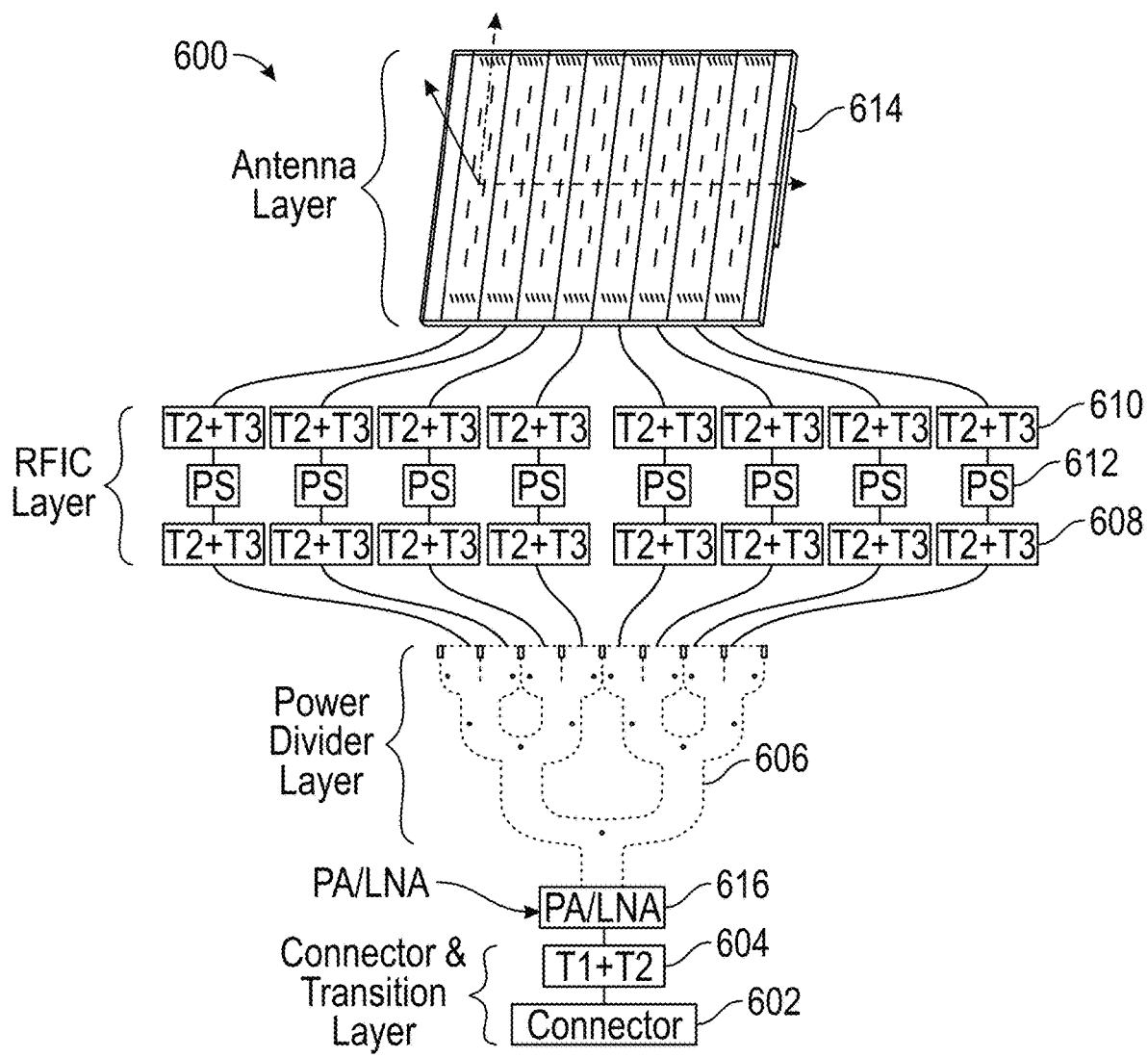
FIG. 6 illustrates a schematic diagram of an antenna system for use with the antenna module of FIG. 5 in accordance with some implementations of the subject technology.

Attention is now directed to FIG. 6, which illustrates a schematic diagram of an antenna system 600 for use with the antenna module 500 of FIG. 5 in accordance with various examples. In the example of FIG. 6, the antenna system 600 has a connector 602 and transition 604 in a connector and transition layer, a power divider layer 606, an RFIC layer with transitions 608-610 and phase shifters 612, and an antenna layer 614. Antenna system 600 also has a Power Amplifier (PA) and a Low Noise Amplifier (LNA) module 616 to boost the transmission signal coming from the connector 602 before the transmission signal is divided in power through the power divider layer 606.

The power divider layer 606 is a type of a power divider circuit that receives an input signal and divides the input signal through a network of paths or transmission lines. Each path may have similar dimensions; however, the size of the paths may be configured to achieve a desired transmission and/or radiation result. The power divider layer 606 is designed to be impedance-matched, such that the impedances at each end of a transmission line matches the characteristic impedance of the line. In some implementations, each transmission line is bounded by a set of vias.

Figure 7:
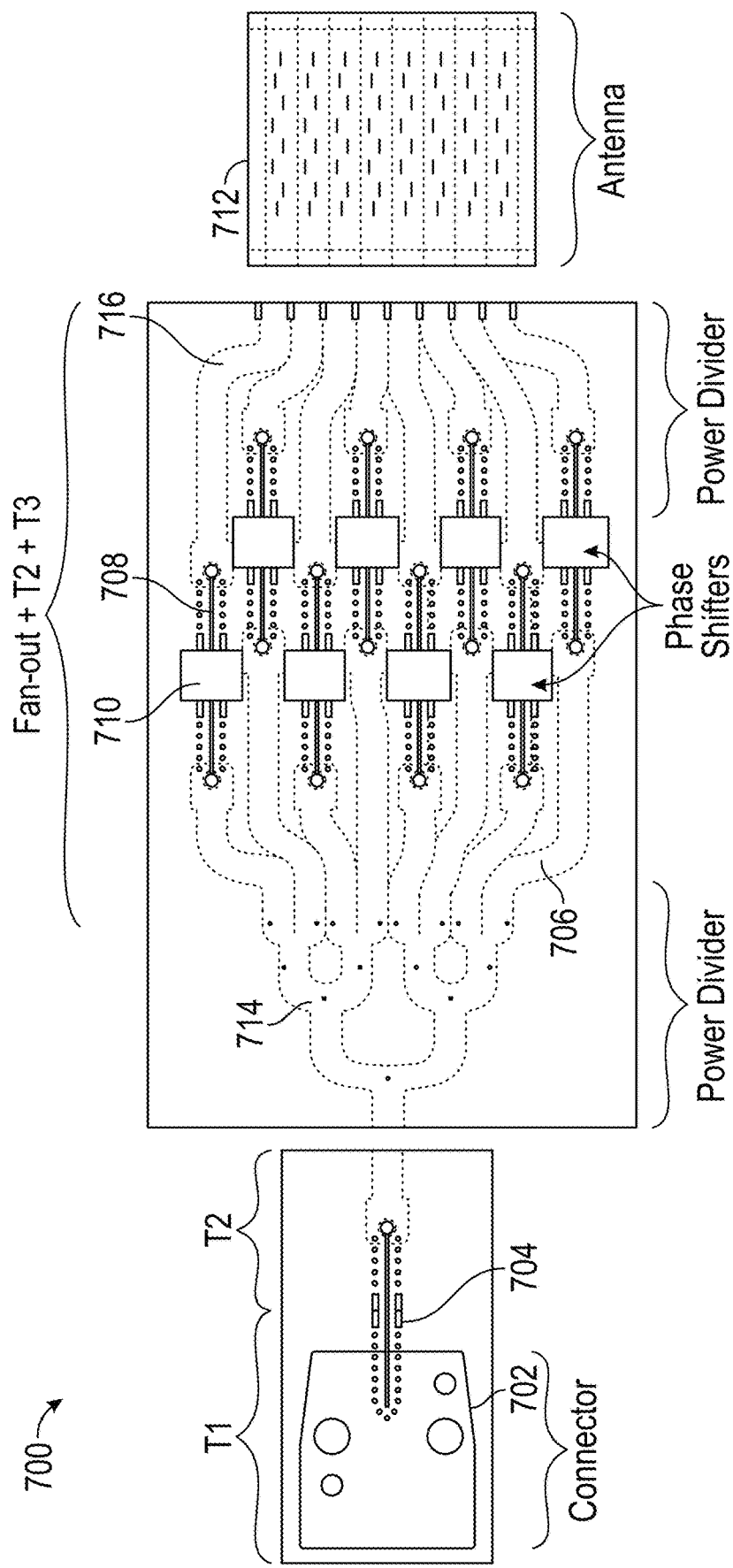
FIG. 7 illustrates a top view of the antenna system of FIG. 7 in accordance with some implementations of the subject technology.

Attention is now directed to FIG. 7, which illustrates an antenna system 700 in accordance with various examples.

The antenna system 700 corresponds to a top view of the antenna system 600 of FIG. 6. As depicted in FIG. 7, the antenna system 700 includes eight (8) layers: (1) a connector and transition layer with connector 702 and transitions 704; (2) a power divider layer with power divider 706; (3) an RFIC layer with transitions 708 and phase shifters 710; and (3) an antenna layer with antenna 712. The power divider 706 is implemented in two separate sections: a first section 714 with a 1:8 power split from the connector 702 to a set of 8 phase shifters (e.g., 710) and a second section 716 with transmission lines connected to the first section 714 via transitions 708. Note that the 8 layers are implemented in such a way as to minimize loss and maximize the use of space. In various examples, the 8 layers are implemented in a single board; in other examples, different boards may be used.

In this example, antenna 712 is an 8×8 antenna array having 8 superelements with 8 radiating slots in each superelement. A superelement, as generally described herein, is formed by set of radiating slots and a transmission line in an antenna base layer as described in more detail below with reference to FIGS. 11-14. Each superelement in the array may be designed to provide RF signals at a specific phase, with phase shifters 710 able to generate any phase shift in a range of 0° to 360° for a complete FoV.

Figure 8:
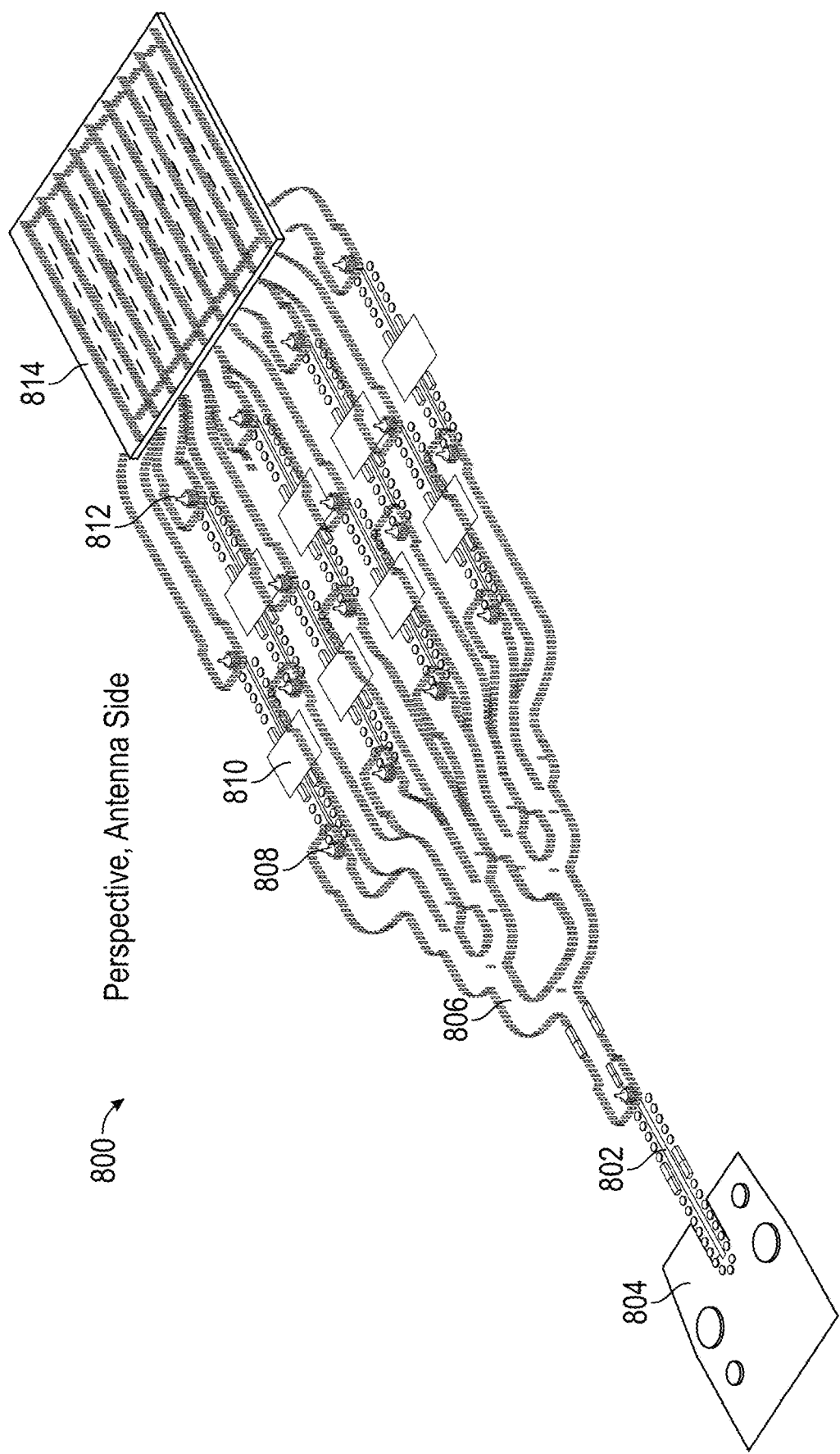
FIG. 8 illustrates a perspective view of the antenna system of FIG. 7 in accordance with some implementations of the subject technology.
Figure 9:
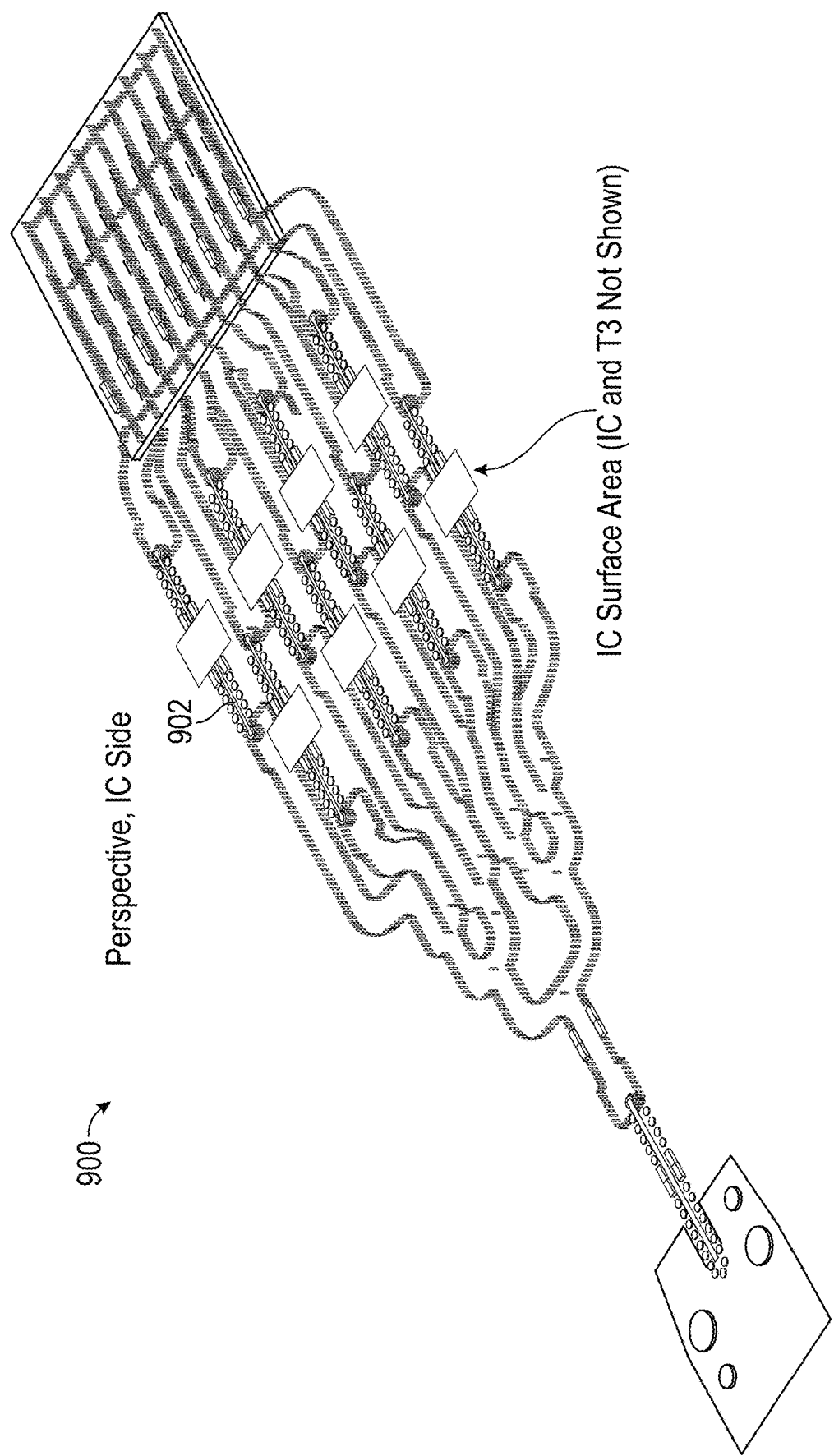
FIG. 9 illustrates another perspective view of the antenna system of FIG. 7 in accordance with some implementations of the subject technology.

FIG. 8 illustrates an antenna system 800 in accordance with various examples. The antenna system 800 corresponds to a perspective view of the antenna system 600 of FIG. 6. The antenna system 800 is shown with transitions 802 from connector 804 to power divider 806, transitions 808 from power divider 806 to phase shifters 810, and transitions 812 from phase shifters 810 to antenna 814. Another perspective view is illustrated in FIG. 9 with antenna system 900, highlighting the RFIC layer 902.

Figure 10:
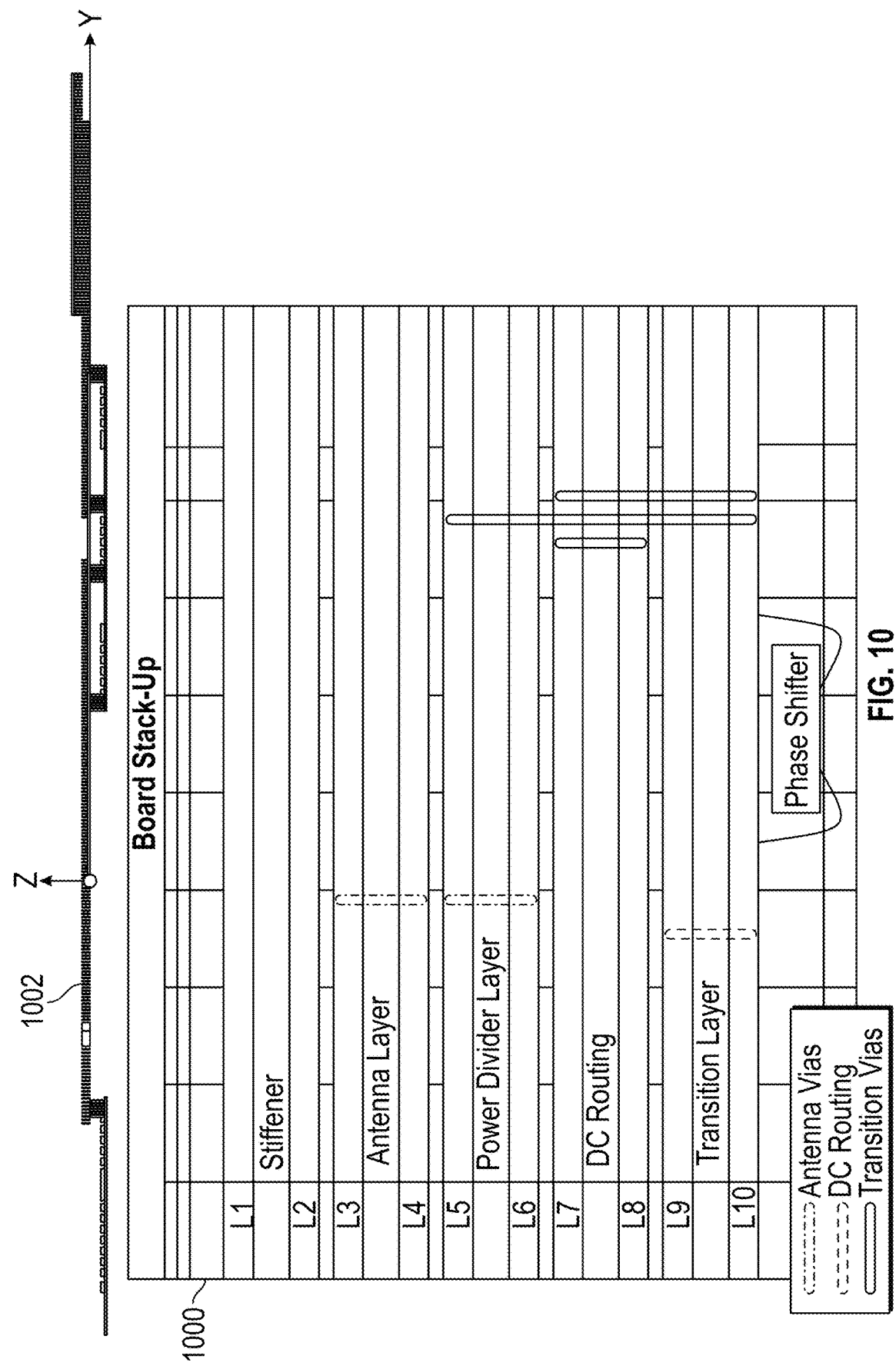
FIG. 10 illustrates a board stack-up configuration for the antenna system of FIG. 7 in accordance with some implementations of the subject technology.

FIG. 10 conceptually illustrates a board stack-up configuration 1000 for the antenna system 600 of FIG. 6 in accordance with various examples. The board stack-up configuration 1000 a stiffener layer disposed on an antenna layer, the antenna layer disposed on a power divider layer, the power divider layer disposed on a DC routing layer, the DC routing layer disposed on a transition layer. In some implementations, each of the layers of the board stack-up configuration 1000 include two conductive layers interspersed by a dielectric layer. The antenna layer and the power divider layer include respective intra-layer antenna vias that couple the two conductive layers to one another through the dielectric layer of the respective stack-up layer. Transition vias penetrate through the power divider layer, the DC routing layer and the transition layer to create a channel between the power divider layer and the transition layer. Other transition vias are added to create a channel between the DC routing layer and the transition layer. The DC routing layer may include intra-layer transition vias. The transition layer may include intra-layer DC routing vias for routing DC power supply lines through the transition layer and to the phase shifters. A side view of the antenna system 1002 is also illustrated, showing how the transitions connect each one of the 4 main layers in the antenna system 1002.

Figure 11:
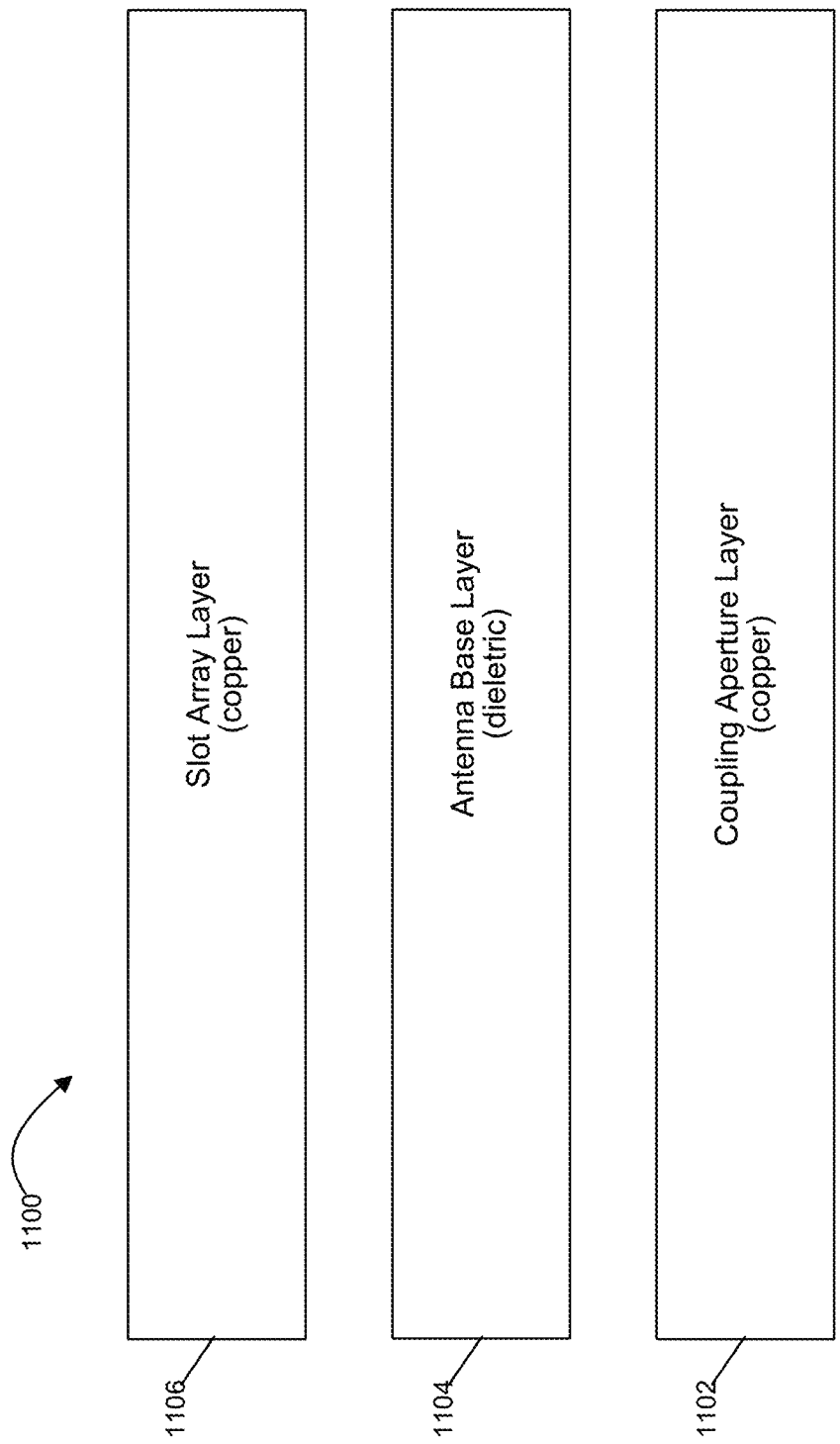
FIG. 11 illustrates an antenna layer for use in the MLMS antenna system of FIG. 6 in accordance with some implementations of the subject technology.

FIG. 11 conceptually illustrates an antenna array layer 1100 for use with an MLMS antenna array in accordance with some implementations of the subject technology. In some implementations, the antenna array layer 1100 includes a coupling aperture layer 1102, an antenna layer 1104 and a slot array layer 1106. In some implementations, the antenna array layer 1100 includes a dielectric layer interposed between two conductive layers, where the coupling aperture layer 1102 and the slot array layer 1106 correspond to the two conductive layers and the antenna layer 1104 corresponds to the dielectric layer. In this respect, the slot array layer 1106 is disposed on the antenna layer 1104, and the antenna layer 1104 is disposed on the coupling aperture layer 1102. In some aspects, each of the coupling aperture layer 1102 and the slot array layer 1106 includes a metallic material, such as copper. The antenna layer 1104 includes a dielectric material and has an array of transmission lines as will be described in further detail in FIG. 13. The slot array layer 1106 includes an array of slots as will be described in further detail in FIG. 14. The array of transmission lines in the antenna base layer 1104 in conjunction with the array of slots in the slot array layer 1106 can form an array of superelements. Each superelement in the array of superelements can provide RF signals at a predetermined phase shift generated by the phase shifters in the RFIC layer.

Figure 12A:
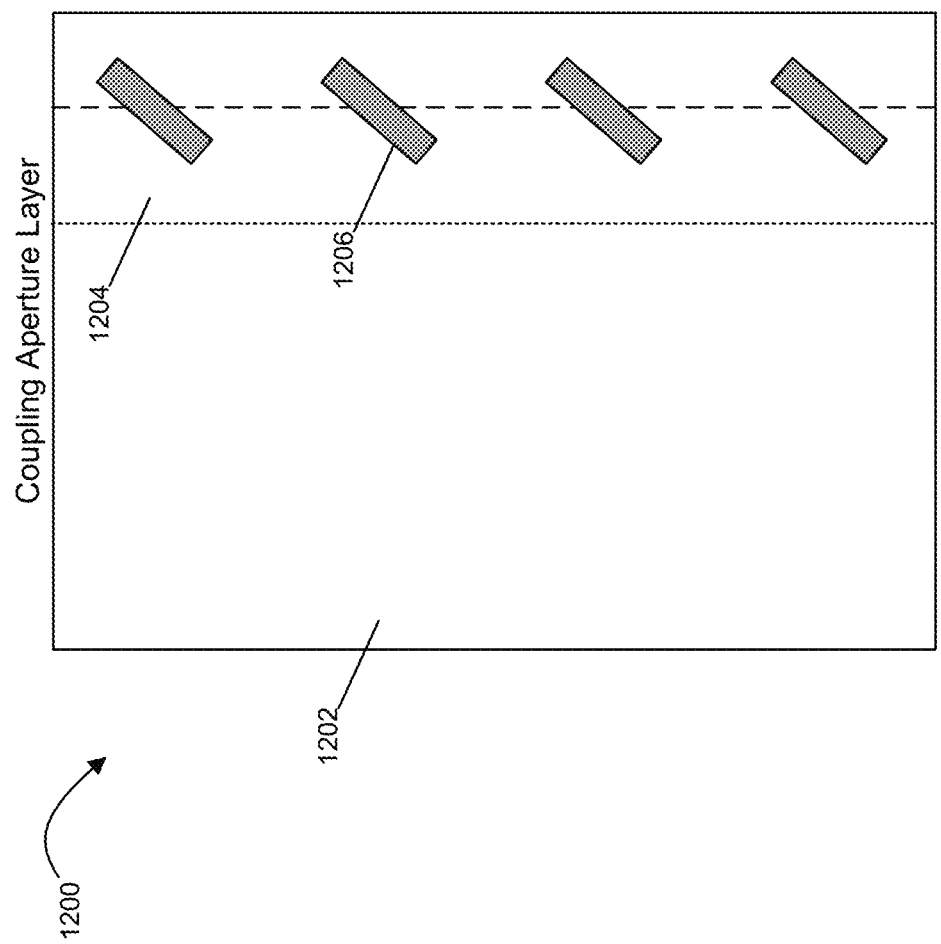

FIGS. 12A-B conceptually illustrate coupling aperture layers with coupling apertures at different orientations in accordance with various implementations of the subject technology. FIG. 12A illustrates a coupling aperture layer 1200 for use in the antenna array layer 1100 of FIG. 11 in accordance with some implementations of the subject technology. The coupling aperture layer 1200 includes multiple apertures 1206 for coupling the transmission signals from the power divider layer 606 to the superelements in a superelement antenna array of an MLMS antenna, e.g., the MLMS antenna system 502 of FIG. 5. The coupling aperture layer 1200 is a conductive layer having two sections, namely a section 1202 and a section 1204. Section 1204 includes the coupling apertures 1206 oriented at a non-orthogonal angle (e.g., 45°) about a centerline, while section 1202 is a contiguous portion of copper material. Each of the coupling apertures 1206 can provide a transmission signal to corresponding radiating slots in the superelements.

Coupling aperture layer 1200 has a plurality of apertures for coupling the signals from the power divider layer to the superelements in the antenna. Layer 1200 is a conductive layer having two sections: section 1202 and section 1204. Section 1204 includes the coupling apertures oriented at an angle (e.g., 45°) about the centerline, while section 1202 is a contiguous portion of copper material. Each coupling aperture or slot, e.g., coupling slot 1206, provides transmission signals to corresponding radiating slots in the superelements. In FIG. 12B, the coupling apertures are oriented at a different angle from that shown in FIG. 12A. (e.g., 130°), or at an angle that is orthogonal to the radiating slots in the antenna. Note that the slots can be oriented at other desired angles, depending on the antenna requirements, the desired applications, antenna characteristics, performance, and so on.

Figure 13:
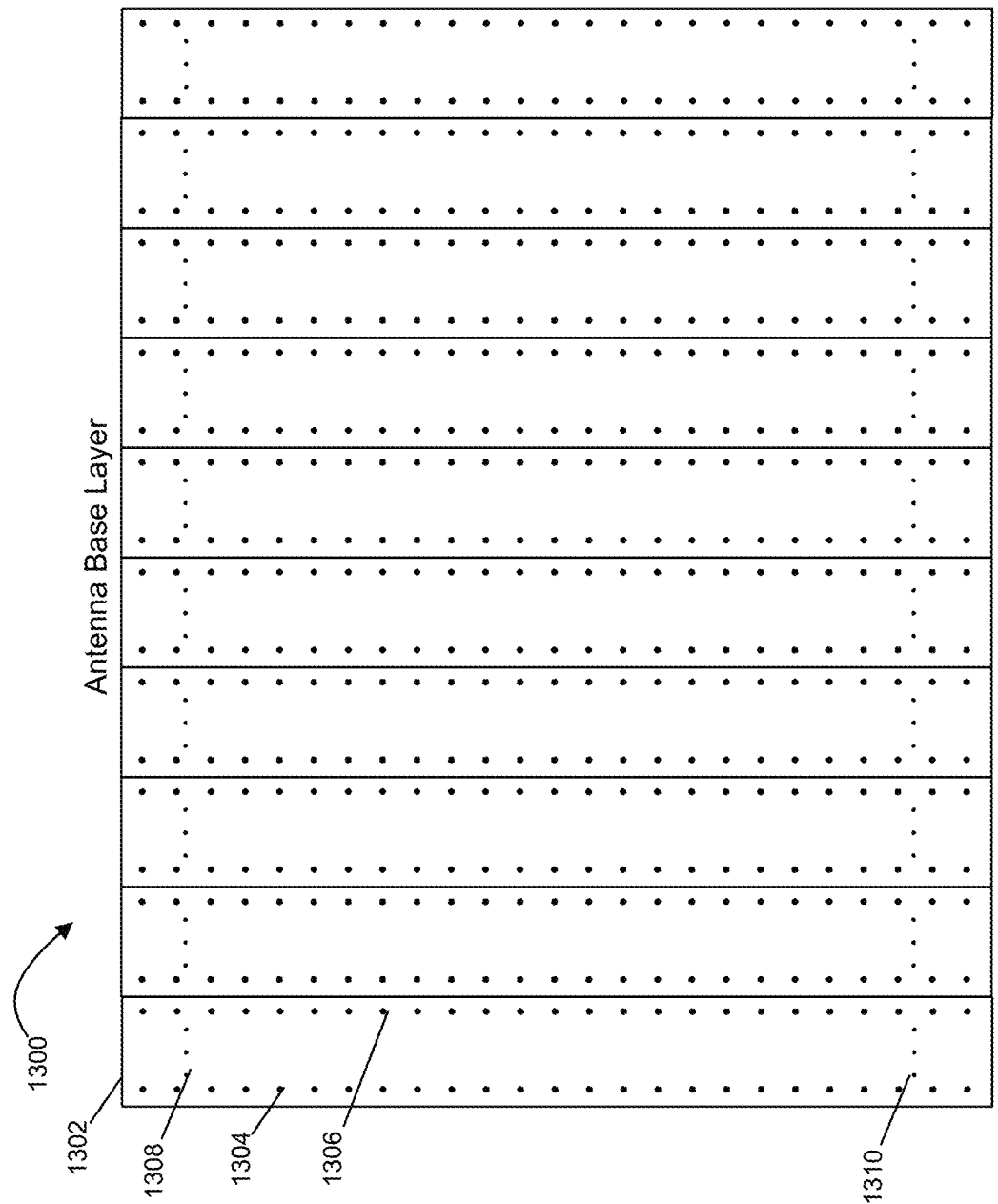
FIG. 13 illustrates an antenna base layer for use in the antenna layer of FIG. 12 in accordance with some implementations of the subject technology.

FIG. 13 illustrates an antenna layer 1300 for use in the antenna array layer 1100 of FIG. 11 in accordance with some implementations of the subject technology. The antenna layer 1300 is depicted with an array of transmission lines, where the antenna layer 1300 is segmented into multiple elements such that each element corresponds to a transmission line. In some implementations, each of the elements includes a set of parallel vias on opposing sides of element and a set of termination vias on opposing ends of the element. For example, the antenna layer 1300 includes element 1302 that includes a set of first vias 1304 arranged along a length of the element 1302 on a periphery of a first side of element 1302 and a set of first vias 1306 arranged in parallel to the set of first vias 1304 on a periphery of a second side of the element 1302. The element 1302 also includes a set of second vias 1308 arranged orthogonal to the set of first vias (e.g., 1304, 1306) and proximate to a first end of the element 1302, and a set of second vias 1310 arranged proximate to a second end of the element 1302, which serve as the termination vias.

There may be any number of elements in the antenna layer 1300 depending on implementation, such as 8, 16, 32 and so on. In some implementations, the antenna layer 1300, a power divider layer (e.g., 606, 706) and a slot array layer (e.g., 1106) have a corresponding number of elements. For example, if the power divider layer has 5 levels with 32 paths for 32 transmission signals, then the antenna layer 1300 can have 32 elements in its array of transmission lines to feed into 32 slot elements of the slot array layer. Although FIG. 13 depicts the antenna layer 1300 with a certain configuration and arrangement of elements and vias, the configuration and arrangement of such features can vary depending on implementation without departing from the scope of the present disclosure.

Figure 14:
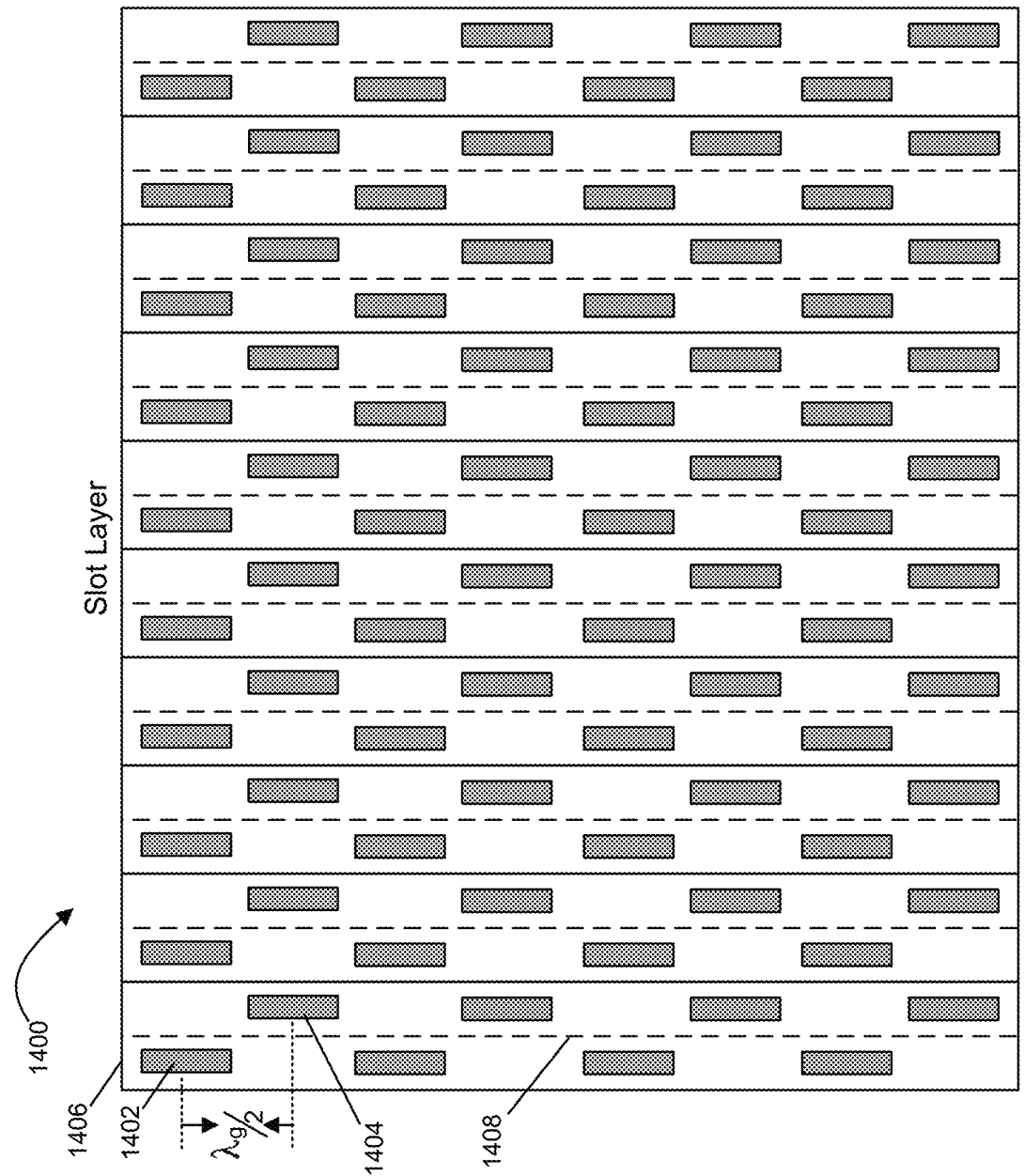
FIG. 14 illustrates a slot layer for use in the antenna layer of FIG. 12 in accordance with some implementations of the subject technology.

FIG. 14 illustrates a slot array layer 1400 for use in the antenna array layer 1100 of FIG. 11 in accordance with some implementations of the subject technology. The slot array layer 1400 includes an array of elements, where each element of the array of elements has multiple slots (or openings) penetrating through the slot array layer 1400 along a top surface of the slot array layer 1400. In some implementations, the slots in each element are equidistant to a center line (depicted as a dashed line) and are staggered from other slots across the center line along a length of the element.

Each element in the slot array layer 1400 together with a corresponding element in the antenna layer 1300 of FIG. 13 can form a superelement. In some implementations, the superelements represent waveguides, which may be bounded by conductive vias along the periphery of each side and by a ground at each (or either) opposing end of the layer. For example, the slot array layer 1400 includes an element 1406 having slots 1402 and 1404 that are equidistant from center line 1408. The distance between the center of a first slot (e.g., slot 1402) in an element (e.g., 1406) of the slot array layer 1400 and the center of an adjacent equidistant slot (e.g., 1404) is depicted as $\lambda_g/2$, where $\lambda_g$ is the guide wavelength. In some examples, the slot array layer 1400 has a 32×8 configuration, where the slot array layer 1400 includes 32 elements with 8 slots in each element.

Figure 15:
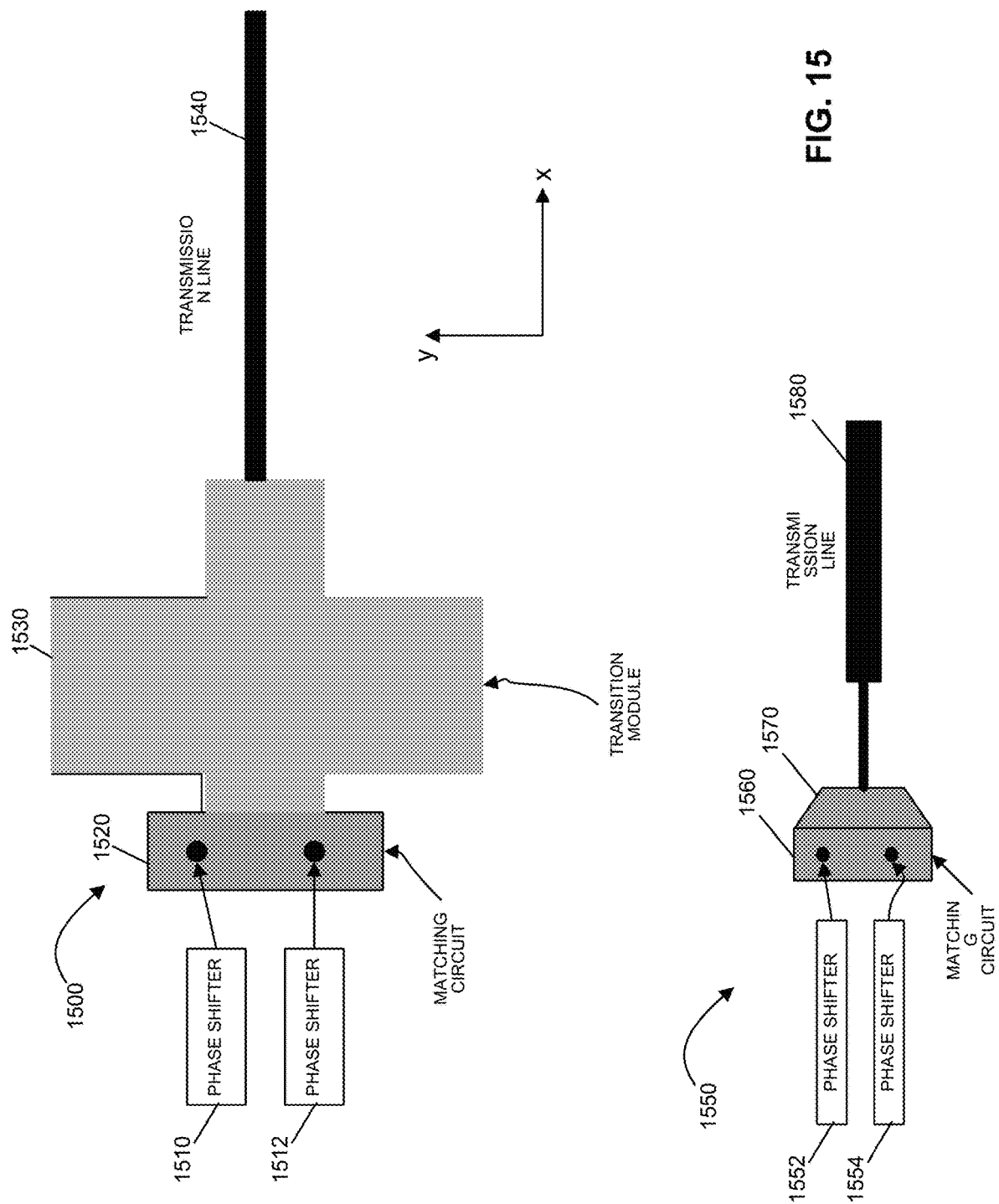
FIG. 15 illustrates a schematic diagram of a transition from an RFIC layer to an antenna layer in accordance with some implementations of the subject technology.

FIG. 15 illustrates schematic diagrams of different transition layer configurations that include a transition from an RFIC layer (e.g., 520) to an antenna layer (e.g., 522). In a first transition layer configuration, a transition layer 1500 is used to couple phase shifters 1510 and 1512 from the RFIC layer to the antenna layer. The transition layer 1500 includes a matching circuit 1520 and a transition module 1530 that couples the matching circuit 1520 to a transmission line 1540 that leads to the antenna layer. In some implementations, the transition module 1530 includes a planar surface that extends along the x- and y-axes. As depicted in FIG. 15, the transition module 1530 includes first stubs that extend along the x-axis and second stubs that extend along the y-axis. In a second transition layer configuration, a transition layer 1550 includes a transition module 1570 that is used to couple phase shifters 1552 and 1554 through a matching circuit 1560 to a transmission line 1580 that leads to the antenna layer. The transition module 1570 may have a different layout configuration than the transition module 1530. As depicted in FIG. 15, the transition module 1570 has a trapezoidal shape; however, the transition module 1570 may include other shapes or layout configurations without departing from the scope of the present disclosure.

Figure 16:
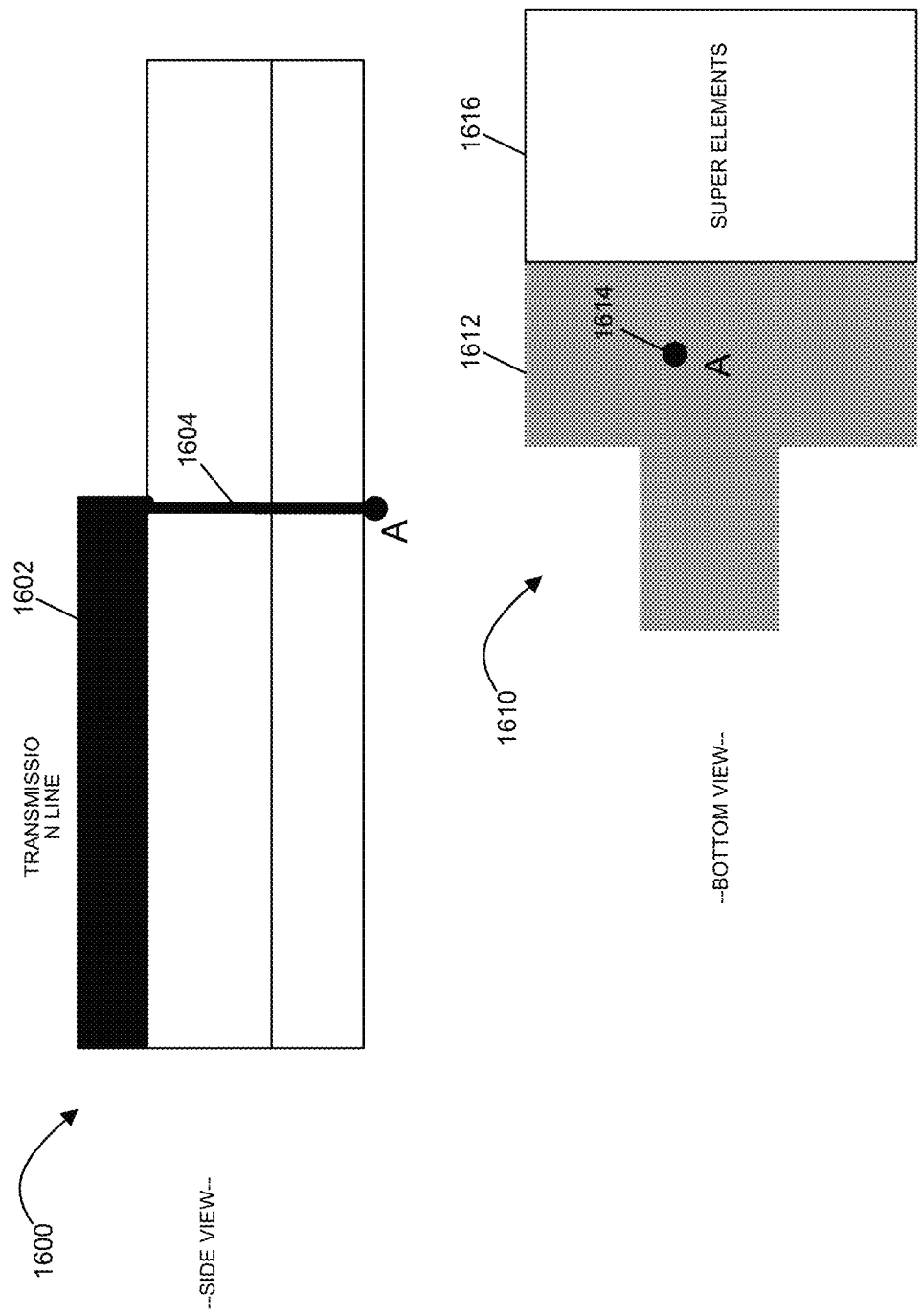
FIG. 16 illustrates another view of a transition from an RFIC layer to an antenna layer in accordance with some implementations of the subject technology.

FIG. 16 illustrates different view configurations of a transition layer according to various examples. In FIG. 16, a cross-sectional view of a transition module 1600 depicts the different layers that form the transition between phase shifters and a transmission line 1602. The transmission line 1602 may be coupled to one or more internal layers of the transition module 1600 through a through-hole via 1604. FIG. 16 also illustrates a bottom view of a transition layer 1610 that includes a transition module 1600 coupled to a superelement antenna array 1616. The transition module 1612 includes a through-hole via 1614 penetrating through one or more internal layers of the transition module 1600 for routing signaling between the transmission line 1602 and the superelement antenna array 1616.

It is appreciated that the disclosed examples are a dramatic contrast to the traditional complex systems incorporating multiple antennas controlled by digital beam forming. The disclosed examples increase the speed and flexibility of conventional systems, while reducing the footprint and expanding performance. The radar system 500 of FIG. 5 may implement the various aspects, configurations, processes and modules described throughout this description. The radar system 500 is configured for placement in an autonomous driving system or in another structure in an environment (e.g., buildings, bill boards along roads, road signs, traffic lights, etc.) to complement and supplement information of individual vehicles, devices and so forth. The radar system scans the environment, and may incorporate infrastructure information and data, to alert drivers and vehicles as to conditions in their path or surrounding environment. The radar system is also able to identify targets and actions within the environment. The various examples described herein support autonomous driving with improved sensor performance, all-weather/all-condition detection, advanced decision-making algorithms and interaction with other sensors through sensor fusion. The radar system leverages intelligent metamaterial antenna structures and AI techniques to create a truly intelligent "digital eye" for autonomous vehicles.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A multi-layer, multi-steering (MLMS) antenna array, comprising:
    a superelement antenna array layer comprising a plurality of superelement subarrays, wherein each superelement subarray of the plurality of superelement subarrays includes a plurality of radiating slots radiating a transmission signal;
    a power divider layer coupled to the superelement antenna array layer and configured to serve as a feed to the superelement antenna array layer, the power divider layer being coupled to a plurality of phase shifters configured to apply tunable phase shifts to transmission signals propagating to the superelement antenna array layer; and
    a transition layer coupled to the power divider layer and configured to couple the power divider layer and the superelement antenna array layer to the plurality of phase shifters through a plurality of transition structures.

2. The MLMS antenna array of claim 1, wherein the transition layer is further coupled to a connector, the transition layer further configured to couple the transmission signal from a transmission signal controller to a printed circuit board that enables a transmission of the transmission signal to the power divider layer.

3. The MLMS antenna array of claim 1, wherein the superelement antenna array layer further comprises an antenna layer, a stiffener layer and a power routing layer, and wherein:
    the stiffener layer is disposed on the antenna layer,
    the antenna layer is disposed on the power divider layer,
    the power divider layer is disposed on the power routing layer, and
    the power routing layer is disposed on the transition layer.

4. The MLMS antenna array of claim 3, wherein the transition layer comprises a matching circuit and a transition module that couples the matching circuit to a transmission line that feeds to the antenna layer.

5. The MLMS antenna array of claim 1, further comprising:
    a radio frequency integrated circuit (RFIC) layer comprising the plurality of phase shifters, wherein the RFIC layer includes a plurality of transition structures that couple the power divider layer to the RFIC layer and from the RFIC layer to the superelement antenna array layer.

6. The MLMS antenna array of claim 1, wherein the power divider layer includes a power divider circuit that has a first section with a M:N power split from the connector to the plurality of phase shifters on the RFIC layer and a second section with N transmission lines connected to the first section via the plurality of transition structures, where M and N are positive integers.

7. The MLMS antenna array of claim 1, wherein the power divider layer is a corporate feed structure having a plurality of transmission lines transmitting the signal to superelement subarrays in the superelement antenna array layer.

8. The MLMS antenna array of claim 1, wherein the power divider layer includes a reactance control module configured to apply the tunable phase shifts to transmission signals propagating to the superelement antenna array layer.

9. The MLMS antenna array of claim 8, wherein the reactance control module includes a radio frequency integrated circuit having one or more of a varactor, a network of varactors, or a phase shift network to apply the tunable phase shifts in a range of 0 degrees to 360 degrees.

10. A radar system for use in an autonomous driving vehicle, comprising:
    an antenna module configured to radiate a transmission signal with a multi-layer, multi-steering (MLMS) antenna in a plurality of directions based on different phase shifts and to generate radar data capturing a surrounding environment of the autonomous driving vehicle, the MLMS antenna comprising:
        a superelement antenna array layer comprising a plurality of superelement subarrays, wherein each superelement subarray of the plurality of superelement subarrays includes a plurality of radiating slots radiating a transmission signal, a power divider layer coupled to the superelement antenna array layer and configured to serve as a feed to the superelement antenna array layer, the power divider layer being coupled to a plurality of phase shifters configured to apply tunable phase shifts to transmission signals propagating to the superelement antenna array layer, and a transition layer coupled to the power divider layer and configured to couple the power divider layer and the superelement antenna array layer to a plurality of phase shifters through a plurality of transition structures; and a perception module configured to detect and identify a target in the surrounding environment from the radar data and to control the antenna module.

11. The radar system of claim 10, wherein the transition layer comprises a matching circuit and a transition module that couples the matching circuit to a transmission line that feeds to the superelement antenna array layer.

12. The radar system of claim 10, wherein the transition layer is further coupled to a connector, the transition layer configured to couple the transmission signal from a transmission signal controller to a printed circuit board that enables a transmission of the transmission signal to the power divider layer.

13. The radar system of claim 10, wherein the superelement antenna array layer comprises a coupling aperture layer, a slot array layer, and an antenna layer, wherein the coupling aperture layer and the slot array layer correspond to two conductive layers and the antenna layer corresponds to a dielectric layer interposed between the two conductive layers, and wherein the slot array layer is disposed on the antenna layer and the antenna layer is disposed on the coupling aperture layer.

14. The radar system of claim 13, wherein the coupling aperture layer comprises a plurality of coupling apertures for feeding radiating signals from the feed network layer into superelements in the superelement antenna array layer, wherein coupling apertures of the plurality of coupling apertures are oriented at a non-orthogonal angle about a centerline, and wherein the coupling aperture layer comprises a contiguous portion of copper material adjacent to the plurality of coupling apertures.

15. The radar system of claim 10, wherein the antenna module comprises a stiffener layer that provides structural support to the MLMS antenna.

16. A multi-layer, multi-steering (MLMS) antenna system, comprising:

a connector and a transition layer configured to receive a transmission signal from a transmission signal controller;

a power divider layer coupled to the connector and the transition layer, the power divider layer comprising a power divider circuit configured to receive the transmission signal and propagate the transmission signal through an array of transmission lines;

a radio frequency integrated circuit (RFIC) layer comprising a plurality of phase shifters configured to apply tunable phase shifts to the transmission signal; and an antenna layer comprising an array of superelements including a plurality of radiating slots, wherein the power divider layer and the antenna layer are coupled to a plurality of phase shifters through a plurality of transition modules that increase a frequency response of the transmission signal at the antenna layer.

17. The MLMS antenna system of claim 16, wherein the RFIC layer includes a plurality of transition structures that couple the power divider layer to the RFIC layer and from the RFIC layer to the antenna layer.

18. The MLMS antenna system of claim 16, further comprising a transition layer comprising a plurality of transition structures, wherein the transition layer couples the plurality of phase shifters from the RFIC layer to the antenna layer with the plurality of transition structures.

19. The MLMS antenna system of claim 18, wherein the transition layer comprises a matching circuit and a transition module that couples the matching circuit to a transmission line that feeds to the antenna layer.

20. The MLMS antenna system of claim 18, further comprising a stiffener layer and a power routing layer, and wherein:

the stiffener layer is disposed on the antenna layer, the antenna layer is disposed on the power divider layer, the power divider layer is disposed on the power routing layer, and the power routing layer is disposed on the transition layer.

* * * * *